United States Patent [19]

Sipple et al.

[11] Patent Number: 5,949,970
[45] Date of Patent: Sep. 7, 1999

[54] DUAL XPCS FOR DISASTER RECOVERY

[75] Inventors: Ralph E. Sipple, Shoreview; Thomas P. Cooper, New Brighton; Dennis R. Konrad, Welch; Michael J. Heideman, New Brighton, all of Minn.

[73] Assignee: Unisys Corporation, Blue Bell, Pa.

[21] Appl. No.: 08/779,681

[22] Filed: Jan. 7, 1997

[51] Int. Cl.[6] ............................................. G06F 11/20
[52] U.S. Cl. .................................... 395/182.13; 711/162
[58] Field of Search ...................... 395/182.13, 182.14; 711/3, 113, 162; 371/40.2, 40.13, 40.15, 51.1; 370/228, 220, 217, 218

[56] References Cited

U.S. PATENT DOCUMENTS

| | | | |
|---|---|---|---|
| 3,685,020 | 8/1972 | Meade | 711/117 |
| 3,806,888 | 4/1974 | Brickman et al. | 711/117 |
| 4,020,466 | 4/1977 | Cordi et al. | 711/201 |
| 4,084,231 | 4/1978 | Capozzi et al. | 711/117 |
| 4,088,254 | 5/1978 | Hooper | 294/65.5 |
| 4,136,386 | 1/1979 | Annunziata et al. | 711/119 |
| 4,298,929 | 11/1981 | Capozzi | 711/201 |
| 4,314,331 | 2/1982 | Porter et al. | 711/133 |
| 4,394,733 | 7/1983 | Swenson | 711/3 |
| 4,603,380 | 7/1986 | Easton et al. | 711/113 |
| 4,646,229 | 2/1987 | Boyle | 707/203 |
| 4,853,843 | 8/1989 | Ecklund | 707/203 |
| 4,897,781 | 1/1990 | Chang et al. | 707/201 |
| 4,967,353 | 10/1990 | Brenner et al. | 711/160 |
| 5,032,979 | 7/1991 | Hecht et al. | 395/187.01 |
| 5,043,885 | 8/1991 | Robinson | 711/133 |
| 5,089,958 | 2/1992 | Horton et al. | 395/182.03 |
| 5,093,787 | 3/1992 | Simmons | 705/33 |
| 5,140,685 | 8/1992 | Sipple et al. | 711/164 |
| 5,146,573 | 9/1992 | Sato et al. | 711/206 |
| 5,163,131 | 11/1992 | Row et al. | 395/200.32 |
| 5,193,162 | 3/1993 | Bordsen et al. | 711/152 |

(List continued on next page.)

OTHER PUBLICATIONS

Kohler, "A Survey of Techniques for Synchronization and Recovery in Decentralized Computer Systems", *Computing Surveys*, vol. 13, No. 2, Jun. 1981, pp. 149–183.

E.I. Cohen et al., 1 "Storage Hierarchies", *Systems Journal*, vol. 28, No. 1, 1969, pp. 62–76.

Nelson et al., "Caching in the Sprite Network File System", *ACM Transactions on Computer Systems*, vol. 6, No. 1, Feb. 1988, pp. 134–154, pp. 134–154.

Howard et al., "Scale and Performance in a Distributed File System", *ACM Transactions on Computer Systems*, vol. 6, No. 1, Feb. 1988, pp. 51–81.

Kaunitz et al., "Audit Trail Compaction for Database Recovery", *Communications of the ACM*, vol. 27, No. 7, Jul. 1984, pp. 678–683.

Gray, "The Recovery Manager of the System R Database Manager", *Computing Surveys*, vol. 13, No. 2, Jun. 1981, pp. 223–242.

Verhofstad, "Recovery Techniques for Database Systems", *Computing Surveys*, Col. 10, No. 2, Jun. 1978, pp. 167–194.

*Primary Examiner*—Joseph E. Palys
*Assistant Examiner*—Pierre E. Elisca
*Attorney, Agent, or Firm*—Charles A. Johnson; Mark T. Starr; Nawrocki, Rooney & Sivertson, P.A.

[57] ABSTRACT

A data processing system including a first and second host, a first and second outboard file cache connected to the first host, and a first and second secondary storage device connected to the first host. The system operation includes the first host reading file data from the first or second secondary storage device after the data is cached on both the first and second outboard file caches. File data is updated by writing to both first and second outboard file caches. File data is destaged by writing data from the first outboard file cache only, to first and second secondary storage devices. Failure of a single outboard file cache is handled by the first host not reading and writing to the failed outboard file cache. Sitewide failure of first host, first outboard file cache, and first secondary storage device is handled by establishing communication from second host to both second outboard file cache and second secondary storage device and resuming processing.

37 Claims, 11 Drawing Sheets

U.S. PATENT DOCUMENTS

| | | | |
|---|---|---|---|
| 5,202,969 | 4/1993 | Sato et al. | 711/143 |
| 5,222,224 | 6/1993 | Flynn et al. | 711/144 |
| 5,263,145 | 11/1993 | Brady et al. | 711/114 |
| 5,305,389 | 4/1994 | Palmer | 382/305 |
| 5,307,484 | 4/1994 | Baker et al. | 707/102 |
| 5,309,451 | 5/1994 | Noya et al. | 371/40.4 |
| 5,325,509 | 6/1994 | Lautzenheiser | 711/137 |
| 5,353,425 | 10/1994 | Malamy et al. | 711/144 |
| 5,371,855 | 12/1994 | Idleman et al. | 711/113 |
| 5,390,318 | 2/1995 | Ramakrishnan et al. | 711/158 |
| 5,404,508 | 4/1995 | Konrad et al. | 707/202 |
| 5,418,921 | 5/1995 | Cortney et al. | 711/114 |
| 5,488,731 | 1/1996 | Mendelsohn | 711/114 |
| 5,499,354 | 3/1996 | Aschoff et al. | 711/129 |
| 5,526,511 | 6/1996 | Swenson et al. | 711/134 |
| 5,530,799 | 6/1996 | Marsh et al. | 345/507 |
| 5,544,343 | 8/1996 | Swenson et al. | 711/133 |
| 5,561,795 | 10/1996 | Sarkar | 707/202 |
| 5,809,543 | 9/1998 | Byers et al. | 711/162 |

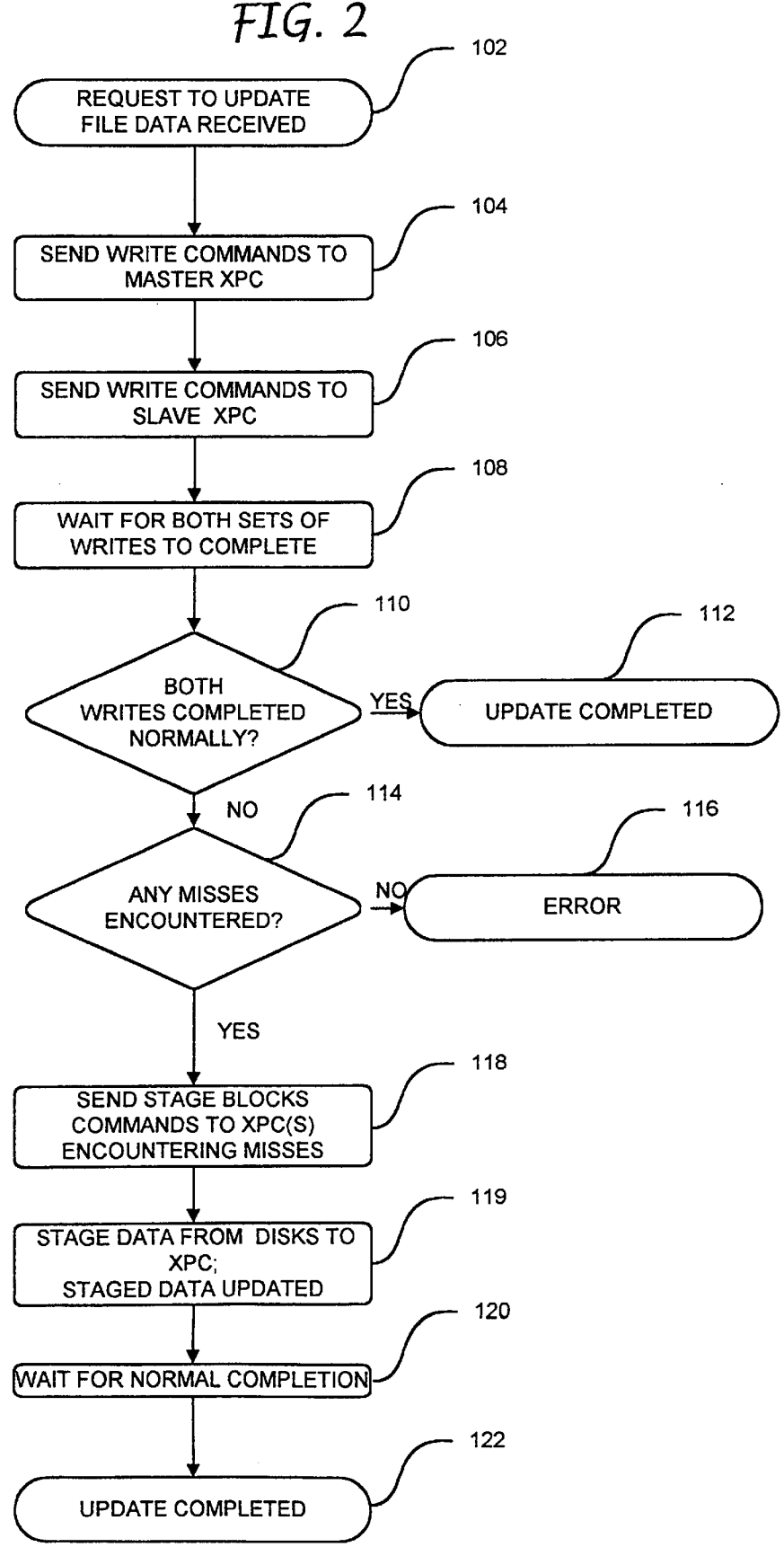

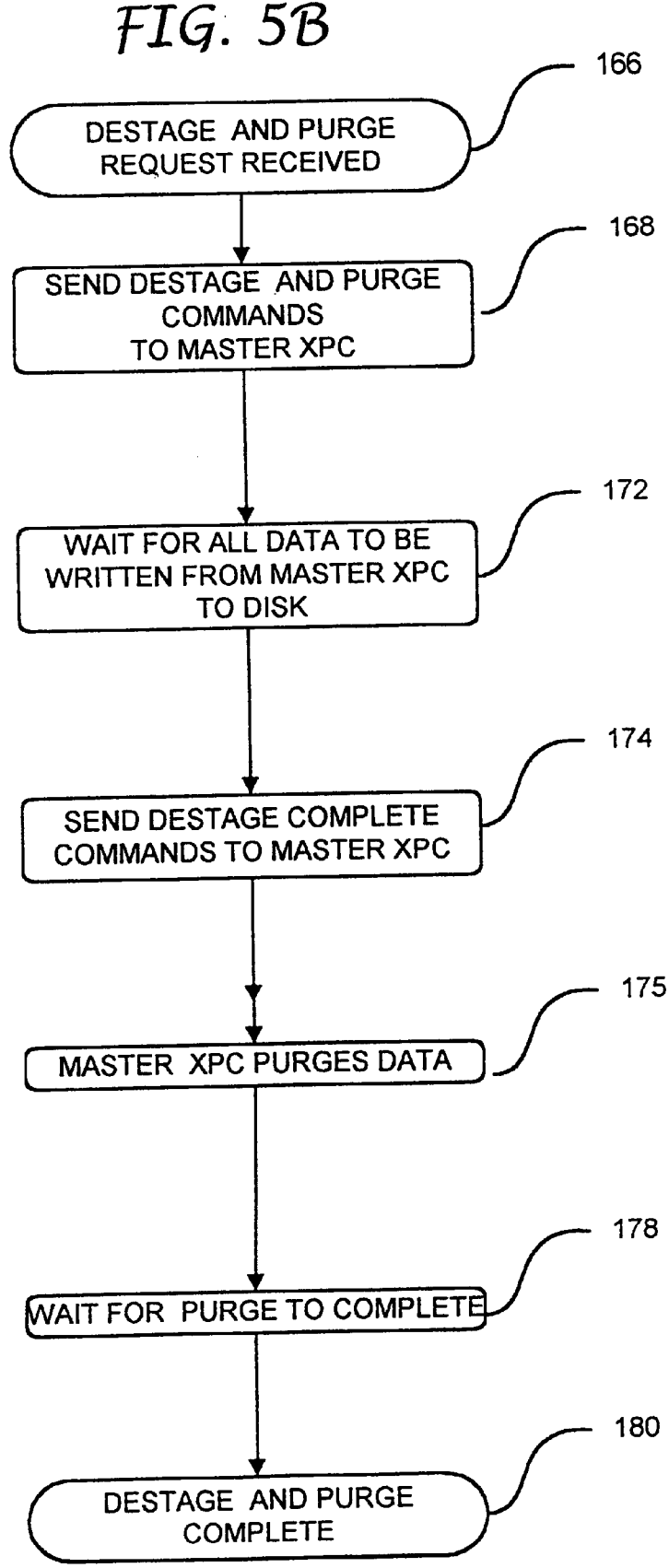

DUAL XPCS FOR DISASTER RECOVERY

CROSS REFERENCES TO CO-PENDING APPLICATIONS

The present application is related to U.S. patent application Ser. No. 08/779,689, filed Jan. 7, 1997, entitled "Dual XPCS" for Disaster Recovery in Multi-Host Computer Complexes", which is assigned to the assignee of the present invention and is hereby incorporated by reference.

BACKGROUND OF THE INVENTION

1. Field of the Invention

The invention relates generally to computer systems. More specifically, the invention relates to dual outboard cache devices for computer system disaster recovery.

2. Description of the Prior Art

High reliability computers and computer systems are used in applications including on-line airline reservation and ticketing systems, credit card transaction systems, and banking and automatic teller machine systems. Such applications require high throughput transaction processing with short response times. The applications require high reliability and availability as users are unable to transact business while the computer system is down.

High throughput has been achieved using an outboard file cache to speed access to files. The term "outboard" refers to the device being located outside of the host input-output boundary. The design and use of an outboard file cache system is described in commonly assigned U.S. patent application Ser. No. 08/174,750, filed Dec. 23, 1993, entitled "Outboard File Cache System", which is herein incorporated by reference. The outboard device is a fully functional computing device. The outboard file cache is also referred to as an "Extended Processing Complex" or "XPC", as the XPC is a preferred embodiment of the present invention. The term XPC is used interchangeably with "outboard file cache" throughout the present application.

The outboard file cache provides fast reading and writing of disk files, but also presents a potential point of failure in a system. In systems having multiple hosts and redundant disk arrays, a single, shared XPC may present a not insignificant portion of total system risk. Even though the XPC is highly reliable, it cannot guarantee reliability in the face of errant forklifts, fire, flooding, and natural disasters.

Adding a second XPC by itself is not sufficient to provide a solution acceptable from both reliability and performance standpoints. Attempting to maintain a second XPC containing exactly the same data as a first XPC through lock-step synchronization, where the first XPC is used as a cache presents significant performance problems to be resolved. The XPC is an intelligent device, handling memory management tasks, deciding when to request that cached files be destaged to disk and what files to request destaging for. Synchronizing two XPCs, especially XPCs at geographically remote sites, would prove difficult. Providing a second site to take over after a failure of the first XPC requires bringing the second site up to date. This could be done using conventional audit trail techniques, but bringing a large database up to date could take hours or days. Writing everything to disk is a solution, but undoes many of the advantages of using cache.

In the larger picture, a single site is also a single point of failure, and rapid recovery from total site failure is also a desirable system feature. Having data in a fast and volatile cache, such as the outboard file cache, is desirable from a performance standpoint, but undesirable when the total site is lost. Continual reads and writes of disk at two sites solve the volatility problem, but undo many advantages of using cache.

What remains to be provided is a system allowing a simple to implement method for rapid recovery from an XPC failure, without requiring audit trails or database management systems, and without giving up the speed advantages of cached file access. What remains to be provided is a system allowing for rapid recovery when one of two computer system sites is lost, while preserving advantages of using cached file access.

SUMMARY OF THE INVENTION

The present invention provides a data processing system allowing for rapid recovery from both failure of a single XPC (Extended Processing Complex, also known as an outboard file cache) and failure of a total data processing site. This is accomplished using dual outboard file caches and system software preserving the speed advantages of file caching and the non-volatility of writing to disk, while providing rapid recovery from disaster without requiring audit trails or database management system.

One preferred embodiment of the invention includes a first host processor for issuing file-access commands and having an input-output logic section which provides an interface for input and output of data and commands to and from the host. The system includes a first outboard file cache and a second outboard file cache, each coupled to the first host input-output section, and a secondary storage device responsively coupled to the first host input-output section. The first outboard file cache is referred to as the "master" and the second as the "slave", a distinction made by the first host, and preferably a distinction not known by the outboard file caches themselves. The preferred embodiment secondary storage includes a first and second storage device, such as disk memory, where the first and second secondary storage devices are written in parallel, or "unit duplexed", by the first host, providing a duplicate set of disks. The outboard file caches include cache storage for files and selectable portions of the files.

The secondary storage device and outboard file caches in a preferred embodiment contain files which include a multiplicity of segments which include a multiplicity of blocks, all of which contain data. The preferred embodiment of the present invention operates on data at file, segment, and block levels, that is, on data generally, and these terms are used in their generic sense throughout the present application.

In the aforementioned embodiment, data is read from the first outboard file cache only, staged to the first outboard file cache from the secondary storage device if necessary. In a preferred method, reads cause space on the second outboard file cache to be speculatively allocated in anticipation of future writes. Data is updated by writing to both first and second outboard file caches, ensuring a second copy exists of the volatile data held in the first outboard file cache. Data is thus not normally written immediately to disk. When volatile data in cache is to be destaged to the backing store, here the secondary storage, data is written from first outboard file cache only to secondary storage. Data is not destaged from the second outboard file cache to secondary storage. Any requests to destage data from the second outboard file cache are ignored. When data is to be destaged and purged, deallocating memory on the outboard file caches, data is destaged only from the first outboard file cache, and space deallocated on both outboard file caches.

Data on the second outboard file cache is thus effectively discarded after the corresponding data on the first outboard file cache is safely on disk.

Recovery from a failed outboard file cache includes informing the first host operating system that only one outboard file cache remains, and that only this device is to have data read or written. Transaction processing can resume rapidly, using the combination of data in the remaining outboard storage device and the secondary storage devices. This can be accomplished without requiring a database management system, and without either outboard file cache device realizing it is involved in a dual outboard file cache system. Changes to reading, writing, staging, destaging, and purging logic in the host are required, as well as some failed outboard cache logic.

Initiating dual outboard file cache mode by a host includes initializing both first and second outboard file caches to contain the same data, and initializing first and second secondary storage device to contain the same data, if that data is to be available after failure of either disk. In a preferred embodiment, during this initialization period, data is written to secondary storage directly, not to the outboard file caches, and space is not speculatively allocated on the second outboard file cache upon reads. This prevents differences between first and second outboard file caches from developing during the initialization period.

Another data processing system embodiment provides recovery from total disaster at a site. This embodiment includes the previously discussed embodiment, wherein the second secondary storage device and second outboard file cache reside at a second site, distinct from the first site containing the first host, first outboard file cache, and first secondary storage device. The embodiment provides a copy of the database present at the first site, contained in combination, between the second outboard file cache and the second secondary storage device. The embodiment includes a second host connectable to the first outboard file cache and the second secondary storage device.

After a disaster at the first site, the second secondary storage device is switched to communicate with the second host rather than the first host. The second outboard file cache, if not communicating with the second host, is set to communicate with the second host. At this point, with the possible exception of data in flight at the time of disaster, a complete copy of first site data is present at the second site, and processing may continue rapidly after switchover, without a lengthy restoration process. The second host may also be connectable to the first secondary storage device and the first outboard file cache, for dual site operation after the first site disaster is remedied, and transfer of production back to the first site is desired.

A typical file life-cycle includes a host requesting a file read, which initially causes disk access to secondary storage for transfer to first outboard file cache, and thereafter requires access only to the first outboard cache. Disk access and transfer therefrom to the second outboard cache is not required even initially. Repeated reads do not require data transfer to or from the second outboard file cache. A write command to the file results in data being written to the file copy cached in both outboard file caches, not requiring transfer to disk.

At some point, the outboard file cache will initiate a request to "destage" a file or file segment, requesting making the data on disk current. This requires only data transfer from first outboard file cache to first secondary storage. If the outboard file cache is in need of space, and a file copy residing in the outboard file cache is not newer than the copy on disk, the outboard file cache can request a purge of the file. Data on the second outboard file cache is effectively discarded. The host can also initiate a "destage and purge", forcing removal of the file from the outboard file cache after making the data on disk current.

Frequently accessed data on disks at the first site will effectively be written to the second outboard file cache at the remote site only for updates, and the slower disks accessed only for the infrequent destaging of the outboard file cache. This preserves the advantages of writes to fast, cache memory, with the advantages of having a duplicate copy of data at a remote site, while greatly reducing data transfer required to secondary storage at the remote site, such as the second secondary storage devices.

An alternate, non-duplexed disk embodiment is also provided by the present invention. In this embodiment, disks are not duplexed, that is, a host can write directly only to the local disks, not to the corresponding disks at the remote site. Instead, a host writes updates to the remote outboard file cache as well as the local outboard file cache. The remote host handles staging and destaging the data between the local outboard cache and disks. In this way, disks need not be duplexed, and a host need only write to the remote outboard file cache, which is likely faster than the remote disks. The remote site handles data a synchronously relative to the production site, but the remote outboard file cache and remote disks, taken in combination, will contain the same data as the production site outboard file cache and disks, taken in combination.

BRIEF DESCRIPTION OF THE DRAWINGS

FIG. 2 is a flow chart illustrating a method for updating data in a computer system including the present invention;

FIG. 5B is a flow chart illustrating a method for destaging data from an outboard file cache (XPC) to disk and purging the data from the outboard file cache (XPC) in a computer system having non-duplexed disks including the present invention;

DETAILED DESCRIPTION OF THE PREFERRED EMBODIMENTS

Figure 1A:
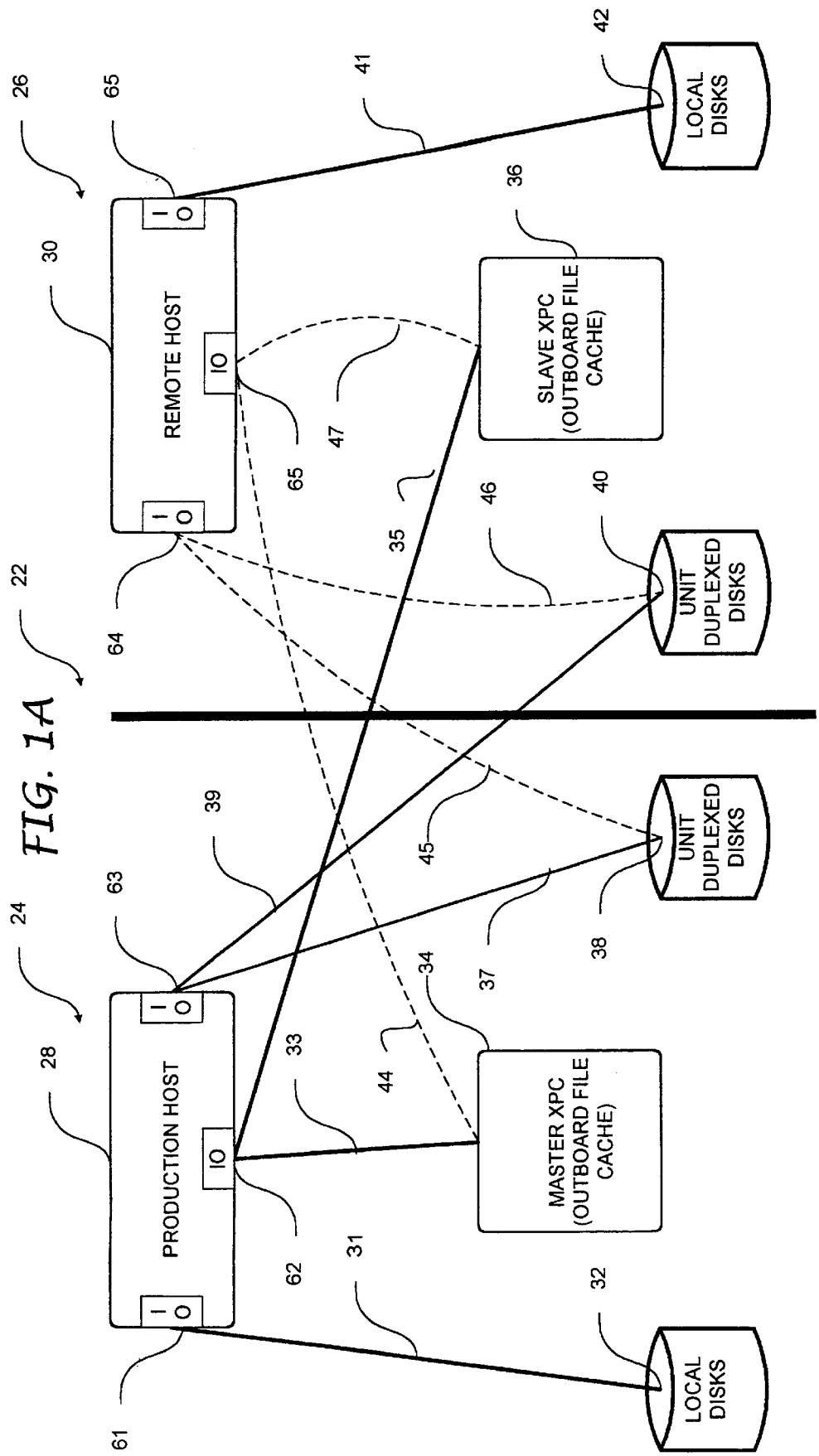
FIG. 1A is a block diagram illustrating a computer system having duplexed disks including the present invention.

FIG. 1A discloses a data processing system 22 at a first, production site 24 and a second, remote site 26. In the preferred embodiment the two sites are geographically dispersed so as to avoid total system failure caused by a common event such as an earthquake or regional power failure.

Production site 24 includes a first, production host 28 in communication with local disks 32 via communication 31, and unit duplexed disks 38, through communication line 37. Production host 28 includes input-output logical sections, denoted by 61, 62, and 63 in FIG. 1A. As described below, unit duplexed disks refer to disks both written with the same data. The duplexing refers to lines 37 and 39 both sending the same data from host 28 to two different disks. Production host 28 is also in communication with XPC 34 via communication line 33. XPC 34 is also known as an "outboard file cache" as described in the Outboard File Cache patent application referenced above. The outboard file cache device is described as "outboard" as it lies beyond the Input-Output boundary of the host, as opposed to a cache in main computer memory. In the preferred embodiment, host 28 accesses files by caching them in XPC 34.

A typical file life-cycle includes an application on host 28 requesting a file read, which generates a read command being sent to XPC 34, which replies with a "miss", indicating the file is not in cache. The host then sends a "stage" command to the XPC, which requests the host to send the appropriate file or file segment to the XPC. A second read command to the XPC results in the requested data being sent back to the application.

A write command to the file results in data being written to the file copy cached in the XPC. A write by the application to an entire file segment not in the XPC causes an "allocate" command to be sent to the XPC, requesting the needed space to contain the file segment be allocated. The data is then written to the newly allocated space in the XPC. If only a portion of a file segment is to be written, the host operating system of course reads the file segment into the XPC before modifying that portion of the segment.

At some point, the XPC will initiate a request to "destage" a file or file segment, writing the data back to the backing store, in this case, disks 38. Upon completion, this will make the file data as new as the data in cache. At some point, the XPC will require additional space, and may utilize the space of a file that is no newer than the copy on disk, by "purging" the file in the outboard file cache. The host carries out the purge and returns a completion status to the outboard file cache. The host may also request a "destage and purge", transferring the file data on XPC to the disks and freeing the memory used in the XPC.

Thus, recently modified file data is written to the XPC, and written to disk only later. Files characterized as "nailed files" are files that are not being merely cached in the XPC, but permanently reside there, and have no corresponding file on disk and are therefore not destageable to disk, but may have images backed up on disk to aid in disaster recovery. Nailed files are owned by the operating system, and cannot be created by applications in the preferred embodiment.

Files characterized as "resident files" are files that can be destaged to disk by the XPC. Resident files are typically files known by the application to be frequently accessed and therefore the application desires the files to remain in the XPC, even when the XPC would otherwise destage the files to disk. A resident file typically resides in the XPC for an extended duration. In one embodiment, the XPC has an unsophisticated aging algorithm for determining when to destage resident files. In another embodiment, the XPC does not have an aging algorithm for determining when to destage resident files. In contrast, a cached file is destageable to disk and resides in the XPC for a short period of time, as determined by the XPC aging algorithm.

The XPC, the outboard file cache, allows access to disk files quickly by accessing the files in the XPC memory rather than disk. The concentration of frequently and recently written data in the XPC is an advantage as the hosts do not have to access slower, rotating secondary memory devices. The concentration of data can also serve as a single point of failure, as the XPC, while internally duplexed, is still vulnerable as a whole, to errant forklifts for example. Losing an XPC means losing the most recently written data, which is stored only in solid state memory in the XPC. In a larger scope, the production site itself serves as a single point of failure. If the production site is vaporized, all data at the site is lost.

A second, remote site is clearly desirable, but the advantages of using the XPC to speed up transactions would be lost if all reads and writes to the XPC at the production site had to be read and written to disks at the remote site.

FIG. 1A illustrates a second, slave XPC 36 in communication with production host 28 via communication line 35, at remote site 26. FIG. 1A also illustrates a remote host 30 at remote site 26 in communication with local disks 42 via communication lines 41. Local disks 32 and 42 are shown in FIG. 1A, illustrating an embodiment having local disks at each site, not containing the same data.

Data communication between remote host 30 and devices shared with production host 28 is indicated by dashed lines. When it is necessary for the remote site to become functional, remote host can communicate with unit duplexed disks 40 via line 46, and with XPC 36 via line 47. Lines 46 and 47 need not be functional while production host 28 is performing the processing. After a switch over to remote site 30, lines 46 and 47 must be fully functional. Corresponding lines 45 and 44, to production site duplexed disks 38 and XPC 34 respectively, need not be fully functional, unless the remote site is to restore the data at the production site after the failure, for switchover to the production site.

The terms "master XPC" and "first XPC" are used interchangeably, to indicate the XPC in communication with host 28 at the production site. In the preferred embodiment, neither XPC knows it is a master or slave, allowing existing XPCs to be used, with no software modification. Master and slave are software distinctions used by the host. In the preferred embodiment, the master XPC is at the same site as the production host.

Initially, before beginning the dual XPC mode, data in duplexed disks 40 at the remote site must be brought up to date, that is, data on disk 38 at the host site must be copied to disk 40 at the remote site. It is not required that the disks contain identical data, but the combination of the XPC and disks at one site must yield functionally the same data.

Figure 1B:
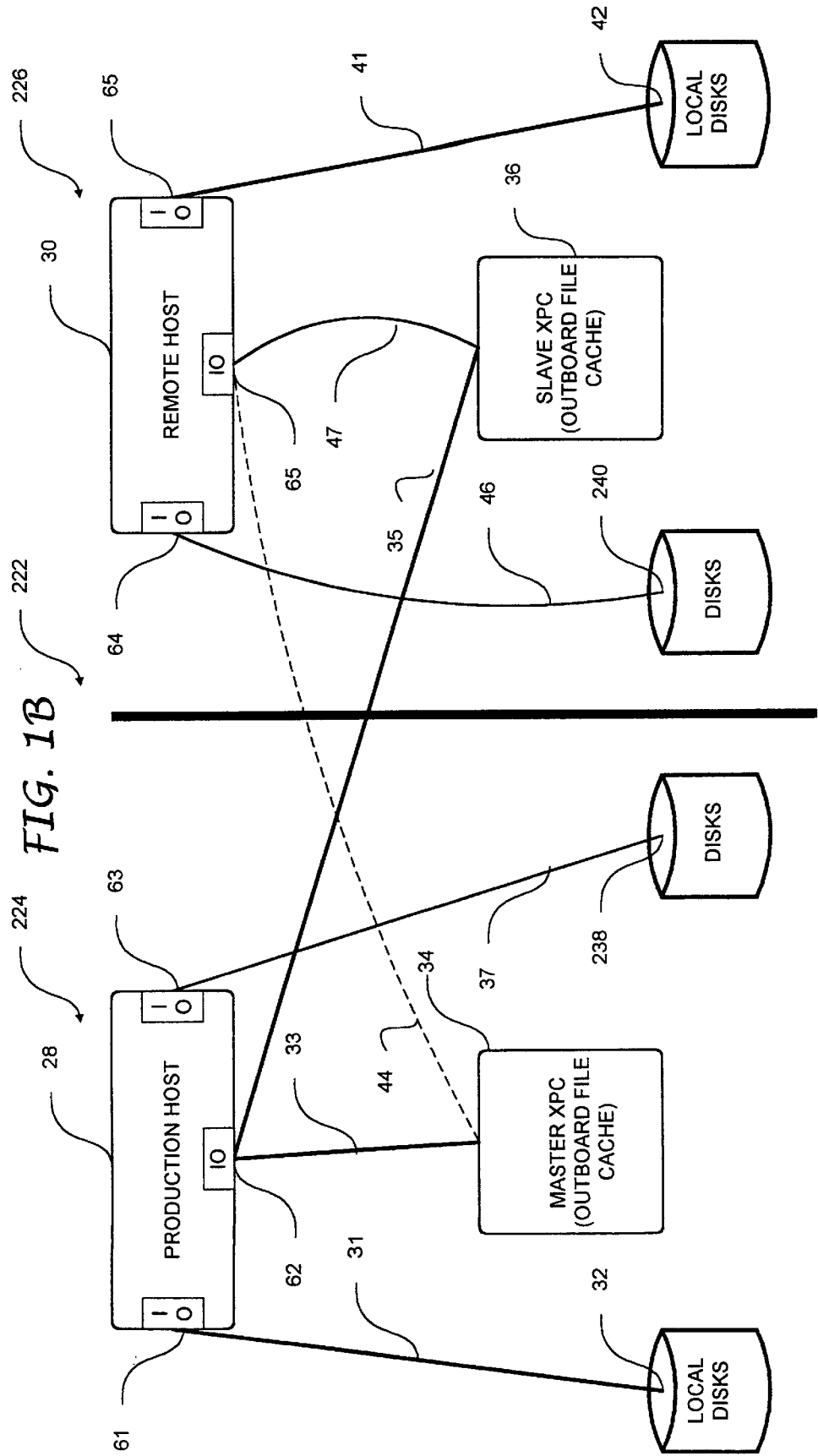
FIG. 1B is a block diagram illustrating a computer system having non-duplexed disks including the present invention.

FIG. 1B discloses an alternate embodiment, "non-duplexed" data processing system 222 at a first, production site 224 and a second, remote site 226. System 222 has disks 238 and 240 which are not-duplexed, meaning that host 28 cannot write, in parallel, directly to both local disks 238 and remote disks 240, only directly to local disks 238. In this embodiment, production host 28 writes updates to master XPC 34 and slave XPC 36. Remote host 30 handles staging and destaging data between slave XPC 36 and local disks 240.

In the typical file life-cycle discussed previously, a request to read data is substantially similar to the request detailed above, as data is not normally read from the slave XPC. A write command involves only writing to the slave XPC, which is likely faster than the remote disks of the duplexed embodiment described above. A destage command from the production host is typically not sent to the slave XPC, as the remote host handles destaging the slave XPC, off-loading the production host. Destage requests by the slave XPC are handles by the remote host, and ignored by the production host. While the non-duplexed embodiment slave XPC and remote disks are asynchronous of their production site counterparts, and may not individually contain the same data as the master XPC and production disks, in combination the data is the same, with allowances for data in flight.

FIG. 2 illustrates the present invention handling of a request to update a file. The word "file" and includes ally, and includes entire files, segments, blocks, and persistent storage of objects generally. FIG. 2 applies to both duplexed and non-duplexed embodiments. When the operating system receives a request to update a file at 102, a write command is sent to both master XPC at 104 and slave XPC at 106, with waiting for status replies from each XPC at 108. If both XPCs report normal completion, at 110, the update is completed at 112. If any misses were encountered, at 114, then the host must send stage blocks commands to the XPC or XPCs encountering misses at 118. Misses are encountered when the file or file segment to be updated reside on disk 38 rather than in XPC 34 cache. If there are misses, the stage blocks commands at 118 will transfer files from disk 38 to XPC 34. In the non-duplexed embodiment, the staging at the slave XPC will in fact be handled by the remote host, data will not be staged from production disks to slave XPC, but from remote disks to slave XPC. Data is staged at 119, and updates performed on the staged data in the XPC.

The above description of updating including checking for misses can be dependent on the size of the write and the particular operating system software. In one embodiment, misses are not reported even though the data being updated is not present in the XPC. This occurs when the data being updated will later overwrite the data in secondary storage, there being no reason to stage the data from secondary storage to outboard file cache. This is advantageous in the nonduplexed disk embodiment, where the update need only be written by the production host to both XPCs, with no staging required, only eventual destaging by the remote host. If the update is not the size of a data chunk addressable in the XPC, a miss will be reported, forcing the old data to be brought into the XPC and updated with the newly received data.

After waiting for normal completion of the stage blocks commands at 120, the update is complete. The update is not considered complete until data is written to both master and slave XPCs. At this point, newly written data resides in cache in both XPCs, the data being newer than the data in on disks.

Figure 3:
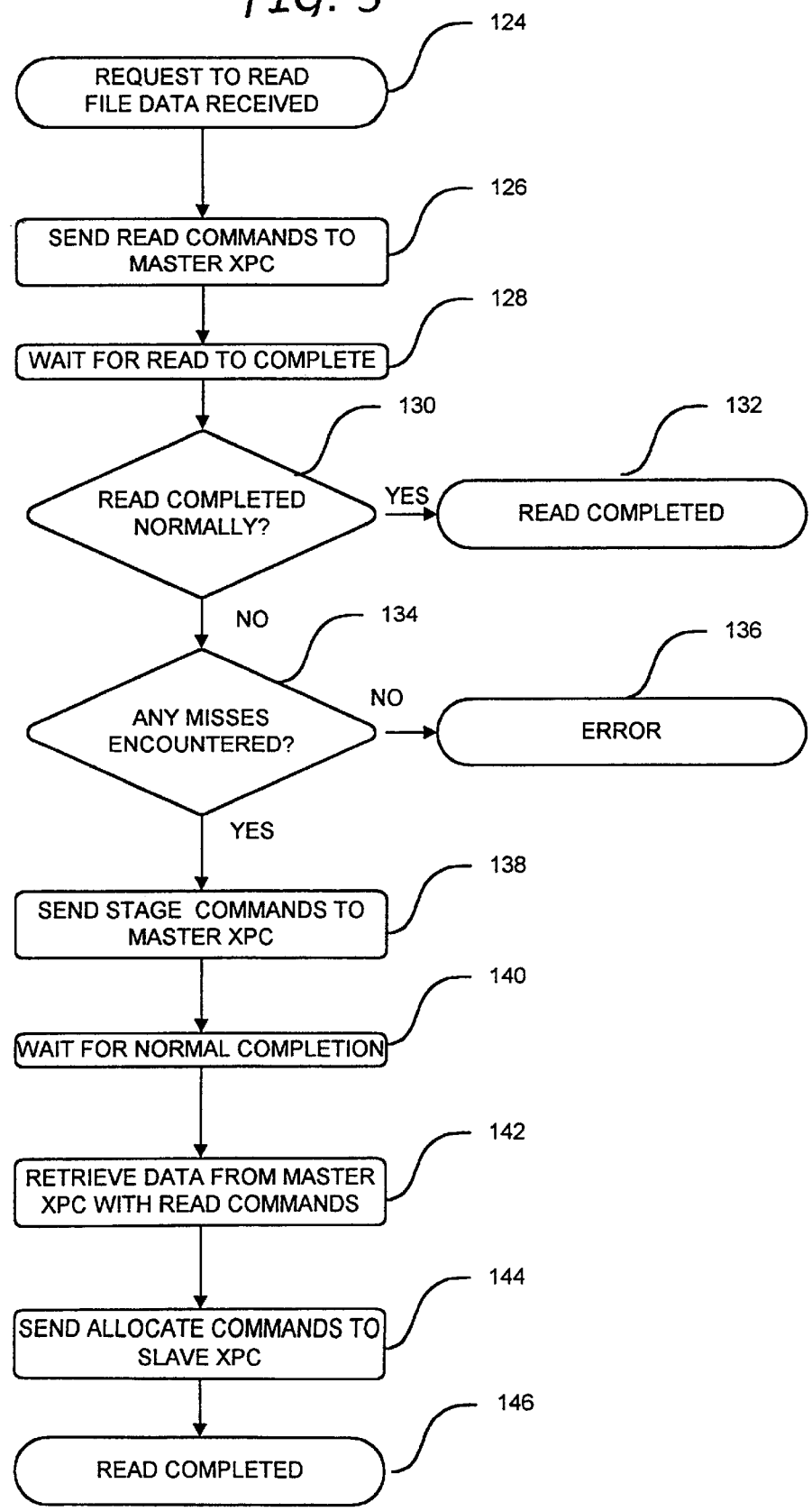
FIG. 3 is a flow chart illustrating a method for reading data in a computer system including the present invention.

FIG. 3 illustrates the handling of a request to read file data at 124 by host 28. Host 28 sends a read command only to master XPC 34 at 126 and waits for completion at 128. If the read completed normally at 130, the read is complete, at 132. It should be noted that the slave XPC is not queried. This means that an application doing significant reading or browsing of files is not accessing the slave XPC. This gives a speed advantage when the communication line 35 to slave XPC 36 is slower than line 33 to master XPC 34, as it may be when remote site 26 is distant from production site 24.

If the read did not complete normally, at 130, due to misses being encountered, at 134, this means the data was not in the master XPC cache, and must be read from disk. At 138, stage commands are sent to the master XPC, and normal completion awaited at 140. When the data has been staged to the master XPC, the data is retrieved from the master XPC with read commands sent from host 28. In the preferred embodiment, allocate commands are sent to slave XPC 36 at 144. The allocate commands are optional. These "speculative" allocate commands cause space to be allocated on slave XPC 36 for the data being staged on master XPC 34. The operating system speculates that reads will be followed by writes, and that latency time for writes from production host 28 to slave XPC 36 will be less if space for the data being written is already available. This is because a later write to slave XPC 36 might otherwise generate a miss as at 114 in FIG. 2. The space allocated on slave XPC 36 may be considered to contain garbage or nulls immediately after allocation and before any writes, even though corresponding to valid data in master XPC 34. After allocation at 144 is complete, the read is completed at 146.

Figure 4A:
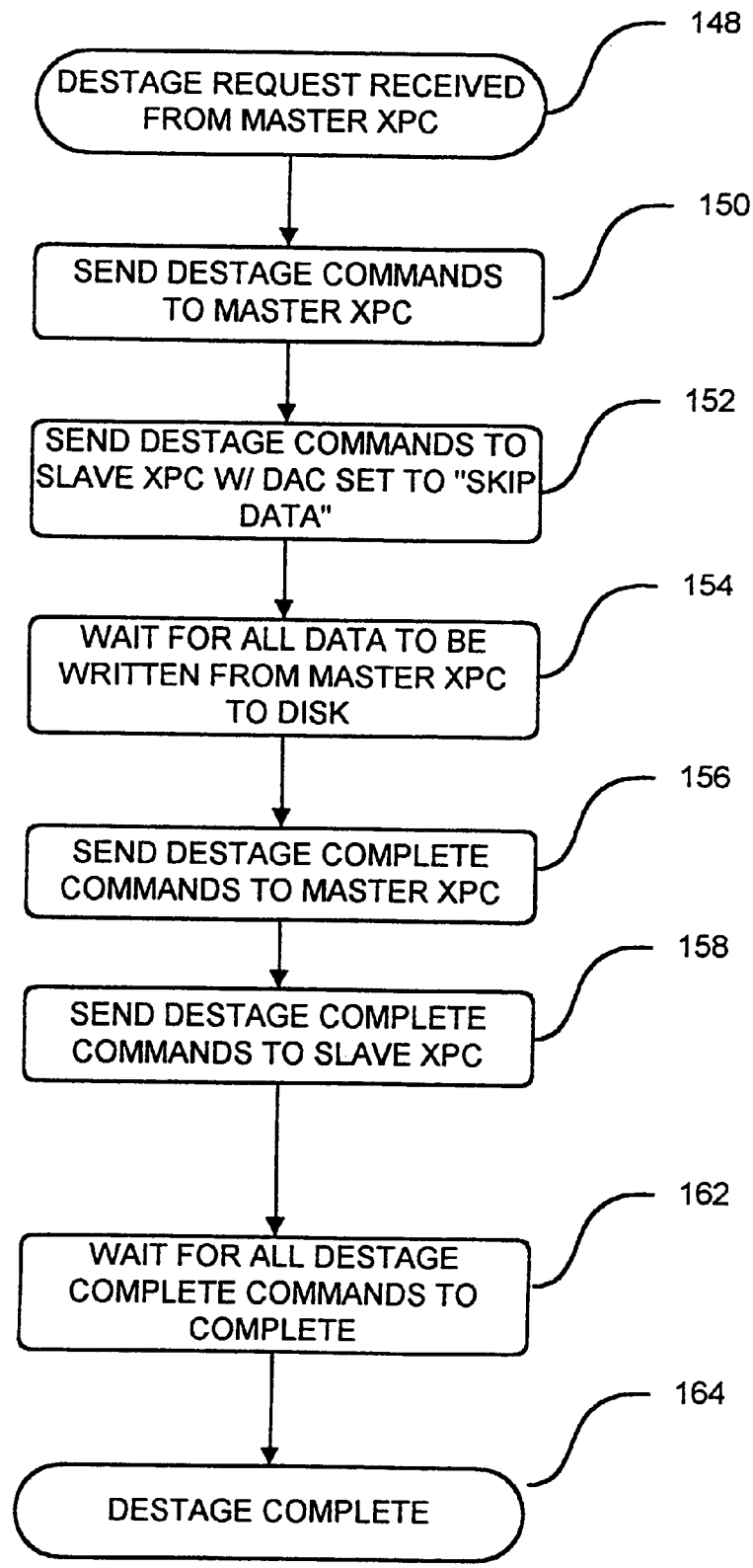
FIG. 4A is a flow chart illustrating a method for destaging data from outboard file cache (XPC) to disk in a computer system having duplexed disks including the present invention.

FIG. 4A illustrates handling of a destage request received from master XPC 34, at 148, in an embodiment having duplexed disks. Destage requests are made by XPC 34, normally when the XPC is full and wishes to free up space for allocation for other files. For example, a least recently used algorithm is used to determine which files to destage. Production host 28 sends destage commands to master XPC 34 at 150. Host 28 also sends destage commands to slave XPC 36 at 152, but with a "Data Access Control" (DAC) fields set to specify "skip data" in the destage request. This will cause slave XPC 36 to free up the allocated space while throwing away data that would normally be destaged to disk 38.

In a preferred embodiment, slave XPC 36 does not know it is a slave, and assumes any data cached within must be destaged to the disk the data originated from, upon receiving a destage command. The above modification of the destage commands sent to the master XPC is a preferred method for preventing slave XPC 36 from destaging data duplicative of that held in master XPC 34, to disks 38. Other methods of preventing data destaging from slave XPC 36 are also within the scope of the invention. Destage completion is awaited at 162 and destaging is considered complete at 164.

Figure 4B:
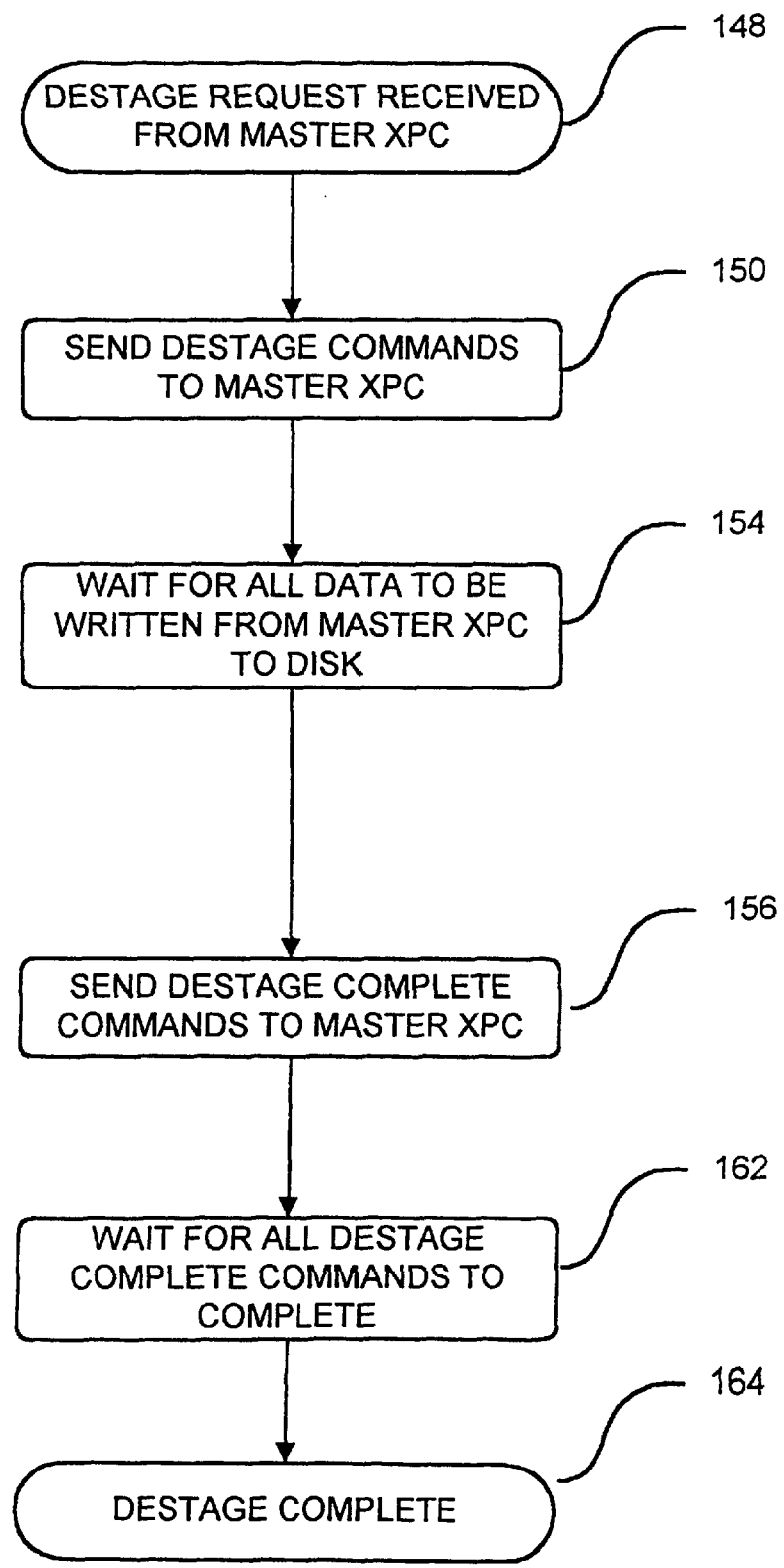
FIG. 4B is a flow chart illustrating a method for destaging data from outboard file cache (XPC) to disk in a computer system having non-duplexed disks including the present invention.

FIG. 4B illustrates handling of a destage request received from master XPC 34, at 148, in an embodiment having non-duplexed disks. FIG. 4B is similar to FIG. 4A, but lacking steps 152 and 158. Step 152 is not necessary as the slave XPC destaging is handled by the remote host, somewhat asynchronously of the production host. Step 158 is not necessary, for the same reason. Destage requests from slave XPC 36 are ignored by production host 28, but handled normally by local, remote host 30. Even though a newly created slave XPC file came from the production host, it is considered to reside on remote disks 240 and will be destaged to disks 240.

Figure 5A:
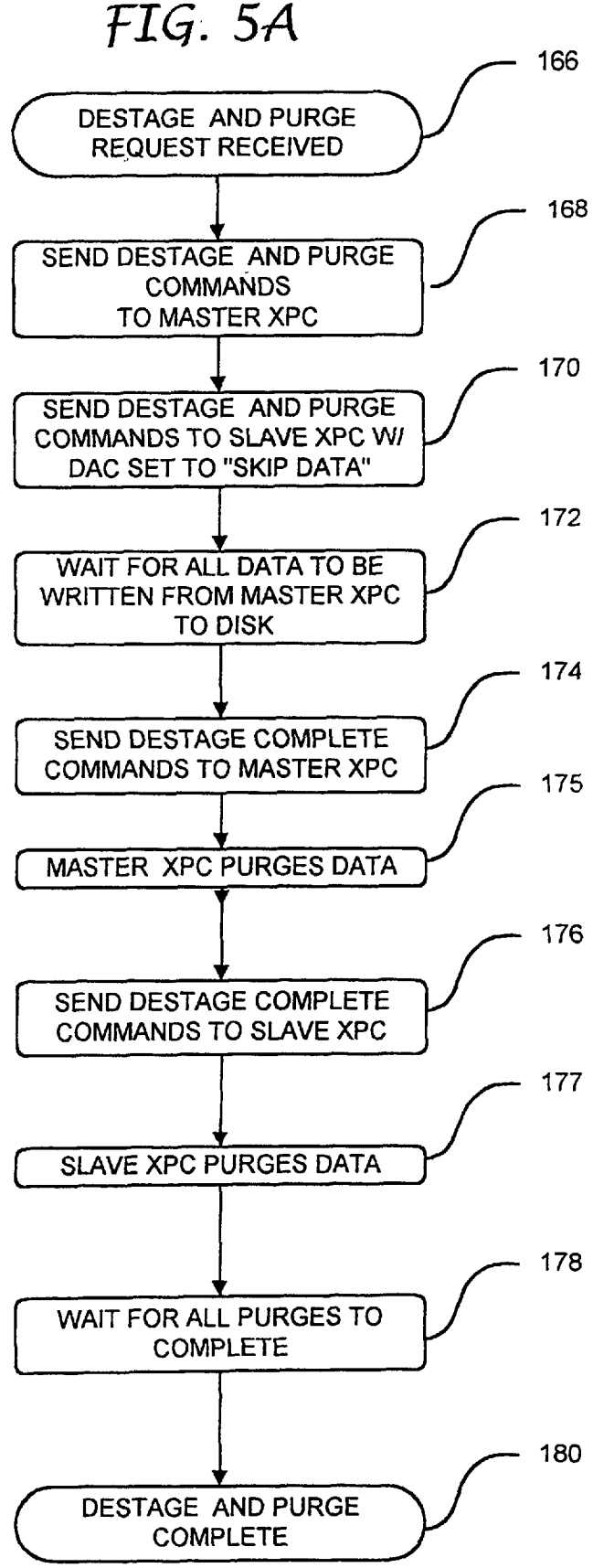
FIG. 5A is a flow chart illustrating a method for destaging data from an outboard file cache (XPC) to disk and purging the data from the outboard file cache (XPC) in a computer system having duplexed disks including the present invention.

FIG. 5A illustrates a method for handling a "destage and purge" request at 166, in an embodiment having duplexed disks. Host 28 sends a "destage and purge" command to master XPC 34 at 168. Host 28 sends similar "destage and purge" commands to slave XPC 36 at 170, but with the Data Address Control (DAC) fields set to "skip data". As discussed previously with respect to step 152 in FIG. 4A, this causes slave XPC 36 to execute a destage and purge, but without sending data back to production host 28. After waiting at 172 for all data to be written from master XPC 34 to unit duplexed disks 38 and 40, a destage complete command is sent to master XPC 34 at 174. Upon receipt of the command, the master XPC purges the data at 175. A destage complete command is sent to slave xPc 36 at 176. Upon receipt of the command, the slave XPC purges the data at 177. After waiting for completion of the purges at 178, destage and purge commands are considered complete at 180.

FIG. 5B illustrates a method for handling a "destage and purge" request at 166, in an embodiment having non-duplexed disks. FIG. 5B is similar to FIG. 5A, but lacks steps 176 and 177. This is because, while purge commands from the production host should be obeyed to destroy unwanted data in the system, a destage and purge command backs up the data before purging and therefore does not change the aggregate amount of data at a site. As discussed previously, the staging and destaging of the slave XPC is handled by the remote host, not the production host.

Figure 6:
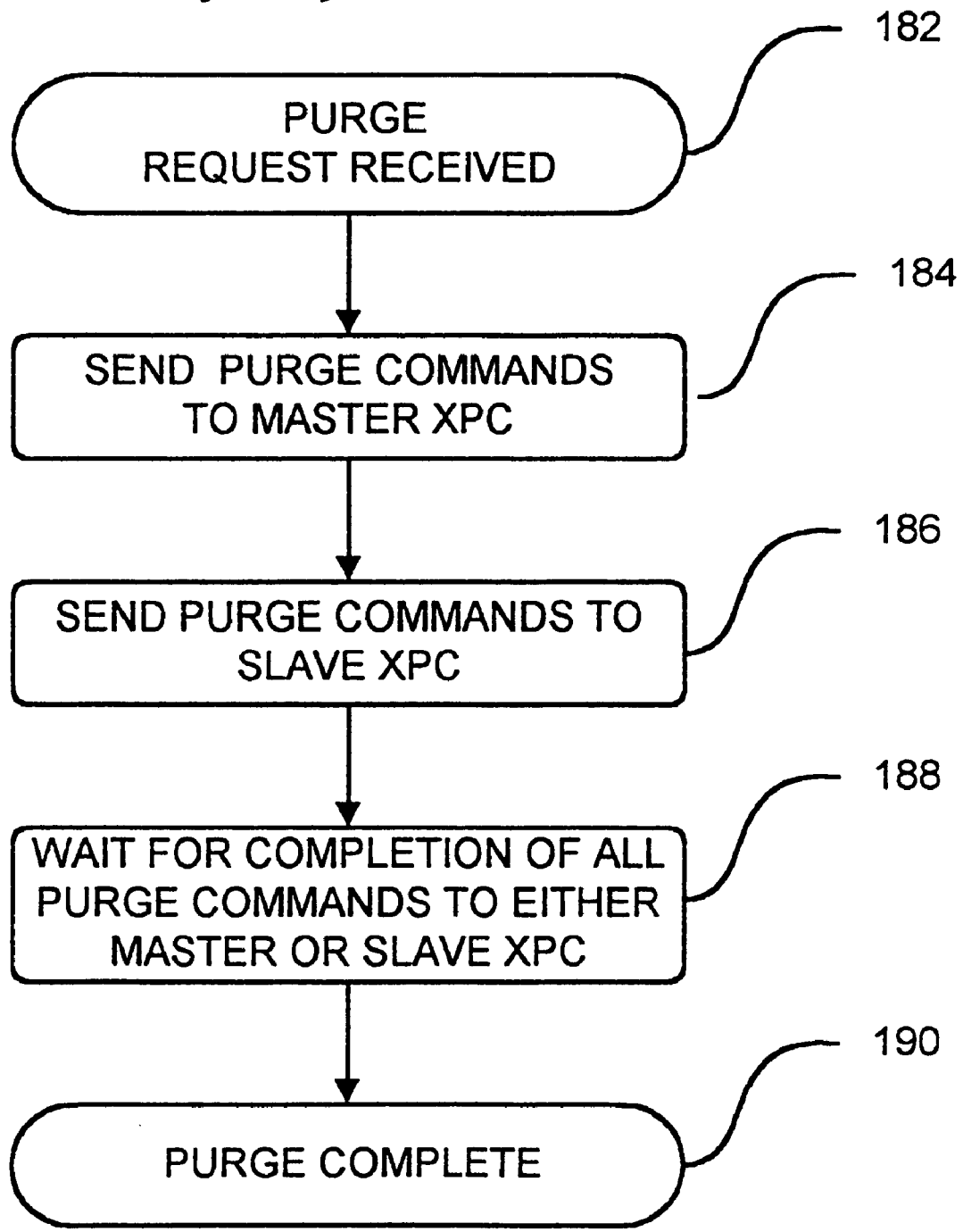
FIG. 6 is a flow chart illustrating a method for purging data from an outboard file cache (XPC) in a computer system including the present invention.

FIG. 6 illustrates handling a purge request at 182. Purges can be initiated by both hosts and XPCs. Purging commands are handled by sending purge commands from host 28 to master XPC 34 at 184, followed by sending identical commands to slave XPC 36 at 186, and awaiting a completion status return from either of the XPCs, at 188. Purge is complete, at 190, when either XPC completes.

It should be noted that FIG. 4A illustrates a method for handling destaging requests from the master XPC only. Slave XPC 36 will be sending destage requests, but such requests received from slave XPC 36 are ignored by host 28. Remote site 26 would not contain a complete copy of all data at production site 24 after slave XPC 36 purges recently updated data in the cache of slave XPC 36, were it not for unit duplexed disks 40 at remote site 26. "Unit duplexed" refers to the fact that disks 38 and 40 are both written to by production host 28. This writing occurs upon destage of data from master XPC 34 only, using the data contained in master XPC 34, which is mirrored by slave XPC 36.

The above described method ensures that remote site 26, considering both disks 40 and slave XPC 36, contains a complete copy of all data contained in disks 38 and master XPC 34. This is accomplished while not requiring reads of disks 40 at the remote site, and without requiring writes to disks 40 at the remote site, except upon destaging the contents of XPC 34. Frequently accessed data on disks 38 at production site 24 will effectively be written to slave XPC 36 at remote site 26 only upon updates, and the slower disks 40 accessed only for the infrequent destaging XPC 34. This preserves the advantages of writes to fast, cache memory, with the advantages of having a duplicate copy of data at a remote site, while greatly reducing data transfer required to secondary storage at the remote site, such as unit duplexed disks 40.

An unrecoverable XPC error is handled by downing he offending XPC. Dual mode is terminated, which requires informing host 28 that only one XPC is to be written to. The production host can run with either XPC 34 or XPC 36 as the remaining XPC in single mode. This is possible in part because "slave" XPC 36 does not know it is a slave in a preferred embodiment, the distinction being known only to production host 28. It should be noted that in using the present invention, there is no need to destage to disk the volatile and recently written contents of the XPC being downed, which can consume not insignificant time in a fast, high throughput transaction processing system. The present invention requires instead downing one XPC and informing the host of the status change. This allows for the rapid handling of an XPC failure.

Figure 7A:
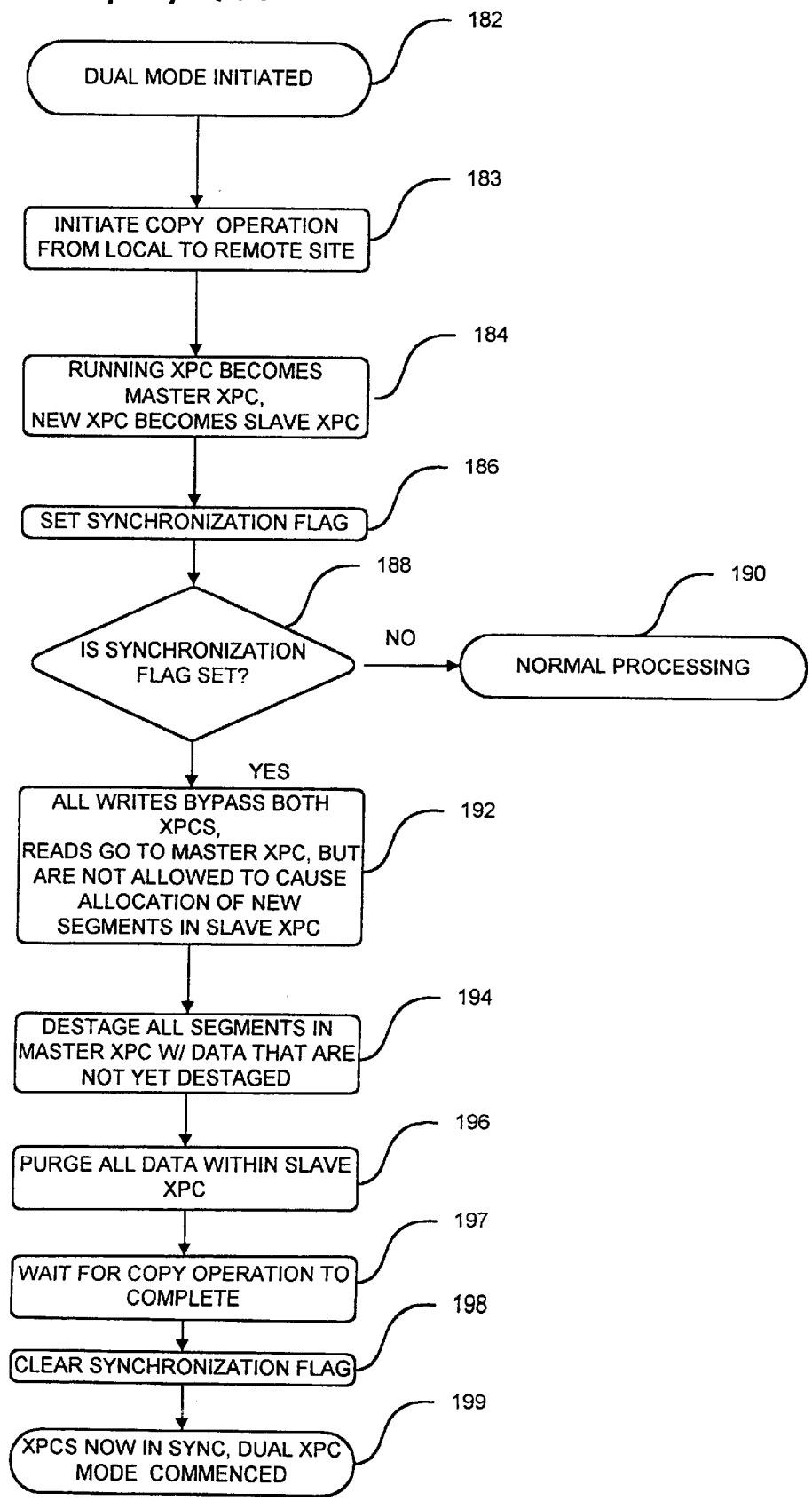
FIG. 7A is a flow chart illustrating a method for initiating dual XPC mode in a computer system having duplexed disks including the present invention.

FIG. 7A illustrates initiation of dual XPC mode which requires "synchronizing" the XPCs, in an embodiment having duplexed disks. This requires that all updated data, not yet destaged to disk, residing in master XPC 34 also reside in slave XPC 36. This also requires that slave XPC 36 not contain any data that does not reside in master XPC 34.

Dual mode is initiated at 182 in FIG. 7A, preferably by a key-in, initiating a disk copy operation from production to emote site, indicated at 183, and causing the running XPC to become the master and the XPC being introduced to become the slave, indicated at 184. A synchronization flag is set at 186, indicating that a synchronization process is active. The synchronization process is a copy of the data from the production to the remote site. During the copy operation, the synchronization flag is set. As long as the synchronization flag is set, tested at 188, all writes bypass both XPCs, going directly to disk, at 192. This ensures that no new updates go to either XPC. Reads still access the master XPC, but writes do not cause allocation of new segments in the slave, as they would without the synchronization flag set, as in step 144 in FIG. 3. This element of the method could alternatively be represented by testing for a set synchronization flag before step 144 in FIG. 3.

At 192, all data segments in the master XPC containing data not yet destaged to disk are destaged. This ensures that the most recent data is copied by the still active copy operation, to the remote XPC. All data within the slave XPC is purged, at 196. When all updated data has been destaged from the master XPC and all data has been purged from the slave XPC, neither XPC contains any data that does not also reside on disk. Completion of the copy operation initiated in step 183 is awaited at 197. This completion insures that all data on disk at the production site is on disk at the remote site. The synchronization flag is cleared at 198 and dual mode operation commenced at 199.

Referring to FIG. 1A, in a preferred embodiment, remote host 30 is not in communication with XPCs 34 or 36, or with disks 38 or 40, illustrated with dashed lines 44, 47, 45, and 46 respectively. In the case where production site 24 is vaporized, a complete set of data resides at remote site 26, either on disks 40 or slave XPC 36. The status of data in flight from host 28 to disks 40 or slave XPC 36 at the time of disaster is indeterminate. To recover from such a disaster, unit duplexed disks 40 at the remote site are switched to communicate with remote host 30 through lines 46, rather than with production host 28 through lines 39. Slave XPC 36 is put in communication with remote host 30 via lines 47. Host 30 commences to run in single XPC mode, using the combination of data in XPC 36 and disks 40.

In another embodiment, remote host 30 is operational and in communication with slave XPC 36. In one embodiment, slave XPC 36 runs in a partitioned mode, the XPC effectively operating as multiple XPCs, for example, one virtual XPC per host. In another embodiment, slave XPC 36 operates in a multiple host mode, the XPC having knowledge that it serves multiple hosts. The embodiments where remote host 30 utilizes slave XPC 36 allows utilization of host 30, rather than requiring the host to be idle unless serving as a production host after disaster recovery. In this embodiment, local disks 42 are used in local processing. In these and other embodiments, slave XPC 36 must have sufficient capacity to allow for production host 28 to ignore destage requests from slave 36, without losing updates written to a "full" slave XPC. In a preferred embodiment, slave XPC 36 or the partition in slave XPC 36 dedicated to production host 28, have a capacity at least that of master XPC 34.

Figure 7B:
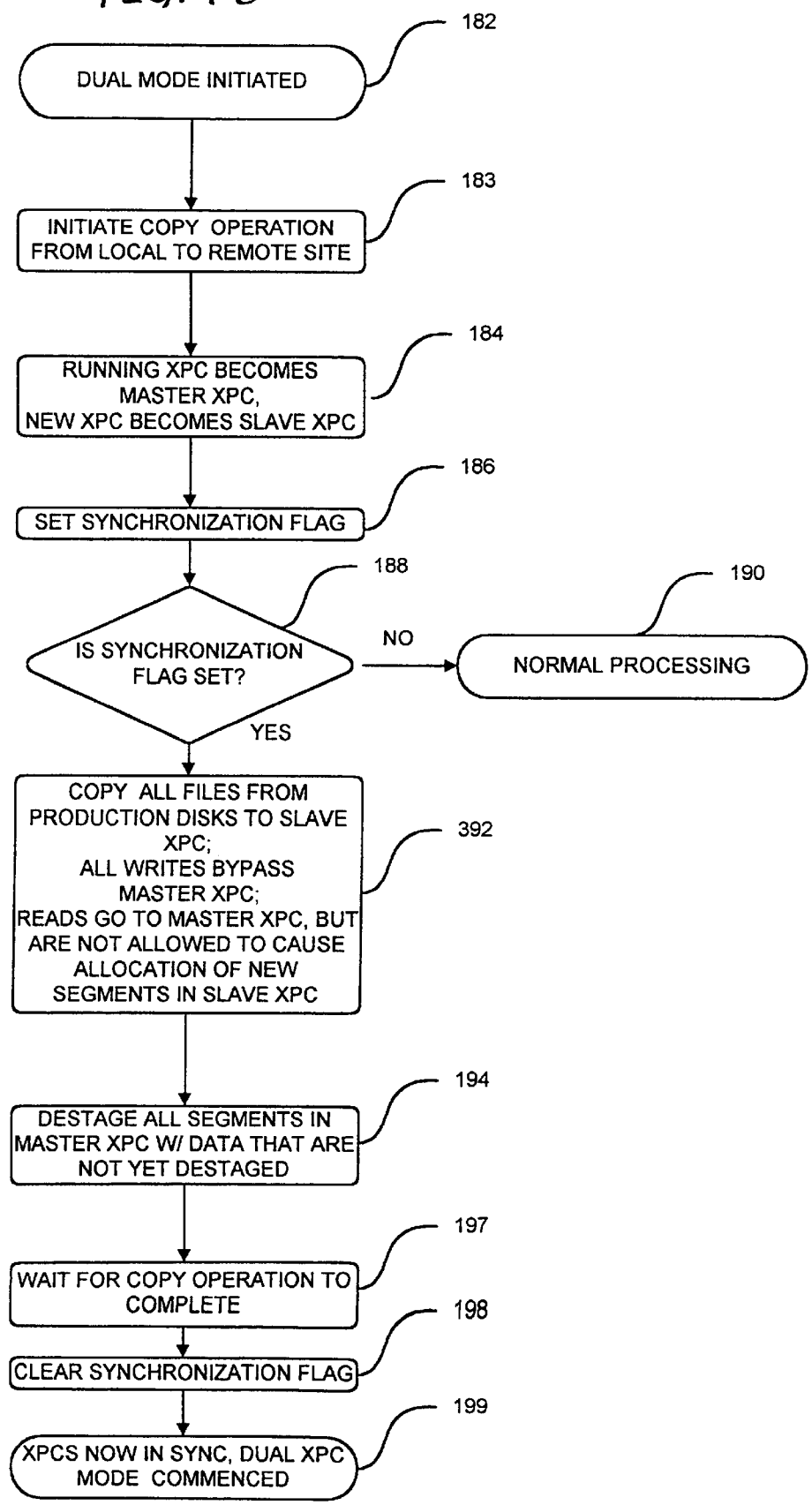
FIG. 7B is a flow chart illustrating a method for initiating dual XPC mode in a computer system having non-duplexed disks including the present invention.

FIG. 7B illustrates initiation of dual XPC mode which requires "synchronizing" the XPCs, in an embodiment having non-duplexed disks. FIG. 7B is similar to FIG. 7A, but having step 392 in place of step 192, and not requiring the purging of data in the slave XPC in step 196. Whereas the system of FIG. 1A allows the production host to write directly to remote disks 40, this is not possible with the system of FIG. 1B, which has no direct connection between production host 28 and disks 240. This requires a different method of copying the data from production site to remote site. In step 392, files are newly created on slave XPC 36, to correspond to, and contain the data of, files on production disks 238. During the synchronization period, production host writes go to disks 238 rather than to master XPC 34, for the same reasons given above for step 192. Once disk 240 contains the data of disk 238, the XPCs are handled, in the same steps as detailed in FIG. 7A. Step 393 this provides an alternate method of copying files.

These disaster recovery mechanisms provides a quick recovery for both batch, transaction and demand systems that have a database management system as well as those that do not. It should be noted that the need for complex and lengthy audit trail recovery scheme at the remote host after disaster is not required. It should also be noted that the present invention does not require that a database management system be in place at all at the remote site. Disaster recovery is provided by the methods discussed above, using reading, writing, staging and destaging primitives, rather than requiring database management primitives.

Numerous characteristics and advantages of the invention covered by this document have been set forth in the forgoing description. It will be understood, however, that this disclosure is, in many respects, only illustrative. Changes may be made in details, particularly in matters of combining, separating, and arranging steps, without exceeding the scope of this invention. It will be understood also, that the naming of states is illustrative, and is applying different labels to states having identical properties is also within the scope of the invention. The invention's scope is, of course, defined in the language in which the appended claims are expressed.

What is claimed is:

1. A data processing system comprising having a first host processor for issuing file access commands, wherein each file access command defines an operation to be performed on a selectable one of one or more files or a selected portion of the one file, the host processor including an input-output logic section which provides an interface for input of data to the host processor and output of data from the host processor; a first outboard file cache coupled to the input-output logic section of the host processor and responsive to the file access commands, wherein the first outboard file cache provides cache storage for the one or more files and includes a cache memory, wherein the cache memory provides random access storage for selectable portions of the one or more files; and a first and a second secondary storage device responsively coupled to the input-output logic section of the first host processor for storing the one or more files, wherein the improvement comprises:

a. a second outboard file cache coupled to the input-output logic section of the host processor and responsive to the file access commands, wherein the second outboard file cache provides cache storage for the one or more files and includes a cache memory, wherein the cache memory provides random access storage for selectable portions of the one or more files;

b. means for initializing the first and second outboard file caches to contain the same cached data;

c. means for initializing the first and second secondary storage devices to contain the same file data;

d. means for reading the file data from at least one of the secondary storage devices, including staging the file data from the secondary storage devices to the first outboard file cache if the data is not present in the first outboard file cache;

e. means for updating the cached data in the first and second outboard file caches corresponding to the file data in the first and second secondary storage devices, including staging the file data from at least one of the first or second secondary storage devices to the first outboard file cache if the data is not present in the first outboard file cache, including staging the file data from at least of the first or second secondary storage devices to the second outboard file cache if the data is not present in the second outboard file cache;

f. means for destaging the cached data in the first and second outboard file caches, including writing the cached data from the first outboard file cache to the first and second secondary storage devices, including not writing the cached data from the second outboard file cache to either first or second secondary storage devices; and g. means for recovering from a failure of one of the outboard file caches, including informing the operating system that the failed outboard file cache is not to have data read from or written to, and resuming data processing.

2. A data processing system comprising:

a. a first host processor for issuing file access commands, wherein each file access command defines an operation to be performed on a selectable one of one or more files or a selected portion of said one file, said host processor including an input-output logic section which provides an interface for input of data to said host processor and output of data from said host processor;

b. a first outboard file cache coupled to said input-output logic section of said host processor and responsive to said file access commands, wherein said first outboard file cache provides cache storage for said one or more files and includes a cache memory, wherein said cache memory provides random access storage for selectable portions of said one or more files;

c. a second outboard file cache coupled to said input-output logic section of said host processor and responsive to said file access commands, wherein said second outboard file cache provides cache storage for said one or more files and includes a cache memory, wherein said cache memory provides random access storage for selectable portions of said one or more files; and d. a first and a second secondary storage device responsively coupled to said input-output logic section of said first host processor for storing said one or more files.

3. A data processing system comprising:

a. a first host processor for issuing file access commands, wherein each file access command defines an operation to be performed on a selectable one of one or more files or a selected portion of said one file, said first host processor including an input-output logic section which provides an interface for input of data to said first host processor and output of data from said first host processor;

b. a first outboard file cache coupled to said input-output logic section of said first host processor and responsive to said file access commands, wherein said first outboard file cache provides cache storage for said one or more files and includes a cache memory, wherein said cache memory provides random access storage for selectable portions of said one or more files;

c. a second outboard file cache coupled to said input-output logic section of said first host processor and responsive to said file access commands, wherein said second outboard file cache provides cache storage for said one or more files and includes a cache memory, wherein said cache memory provides random access storage for selectable portions of said one or more files;

d. a first, secondary storage device responsively coupled to said input-output logic section of said first host processor for storing said one or more files;

e. a second, secondary storage device responsively coupled to said input-output logic section of said first host processor for storing said one or more files;

f. a second host processor for issuing file access commands, wherein each file access command defines an operation to be performed on a selectable one of one or more files or a selected portion of said one file, said second host processor including an input-output logic section which provides an interface for input of data to said second host processor and output of data from said second host processor, wherein said second host processor is data connectable to said second secondary storage device, wherein said second host processor is data connectable with said second outboard file cache;

g. means for initializing said first and second outboard file caches to contain the same cached data;

h. means for initializing said first and second secondary storage devices to contain the same file data;

i. means for reading said file data from said first secondary storage device, including staging said file data from said first secondary storage device to said first outboard file cache if said data is not present in said first outboard file cache;

j. means for updating said cached data in said first and second outboard file caches corresponding to said file data in said first and second secondary storage devices, including staging said file data from at least one of said secondary storage devices to said first outboard file cache if said data is not present in said first outboard file cache, including staging said file data from at least one of said secondary storage devices to said second outboard file cache if said data is not present in said second outboard file cache;

k. means for destaging said cached data in said first and second outboard file caches, including writing said cached data from said first outboard file cache to said first and second secondary storage devices, including not writing said cached data from said second outboard file cache to either first or second secondary storage devices; and l. means for recovering from a failure of one of said outboard file caches, including informing the operating system that the failed outboard file cache is not to have data read from or written to, and resuming data processing.

4. A data processing system as recited in claim 3, wherein said first host processor, first outboard file cache, and first secondary storage device reside at a first site and said second host processor, second outboard file cache, and second secondary storage device reside at a second site, wherein said second host processor is data connectable to said second secondary storage device, further comprising:

means for recovering from failure of said first site, including ensuring said second host processor is in communication with said second outboard file cache, ensuring said second host processor is in communication with said second secondary storage device, and resuming data processing.

5. In a data processing system having:

a. a first host processor for issuing file access commands, wherein each file access command defines an operation to be performed on a selectable one of one or more files or a selected portion of the one file, the host processor including an input-output logic section which provides an interface for input of data to the host processor and output of data from the host' processor;

b. a first outboard file cache coupled to the input-output logic section of the host processor and responsive to the file access commands, wherein the first outboard file cache provides cache storage for the one or more files and includes a cache memory, wherein the cache memory provides random access storage for selectable portions of the one or more files;

c. a second outboard file cache coupled to the input-output logic section of the host processor and responsive to the file access commands, wherein the second outboard file cache provides cache storage for the one or more files and includes a cache memory, wherein the cache memory provides random access storage for selectable portions of the one or more files;

d. a first, secondary storage device responsively coupled to the input-output logic section of the first host processor for storing the one or more files;

e. a second, secondary storage device responsively coupled to the input-output logic section of the first host processor for storing the one or more files; and f. a second host processor for issuing file access commands, wherein each file access command defines an operation to be performed on a selectable one of one or more files or a selected portion of the one file, the host processor including an input-output logic section which provides an interface for input of data to the host processor and output of data from the host processor, wherein the second host processor is data connectable to the second secondary storage device, wherein the second host processor is data connectable with the second outboard file cache, a method for updating cached data corresponding to file data in the first and second secondary storage devices with new data comprising the steps:

i. if the cached data is not present in the first outboard file cache, staging the file data from either of the secondary storage devices to the first outboard file cache;

ii. if the cached data is not present in the second outboard file cache, staging the file data from either of the secondary storage devices to the second outboard file cache;

iii. writing the new data to the first outboard file cache; and iv. writing the new data to the second outboard file cache.

6. A method for updating cached data as recited in claim 5, further comprising:

a. checking for an indication that the first host processor is transitioning from a single outboard file cache mode to a dual outboard file cache mode before said staging and writing steps; and b. if said indicator indicates said transition, writing the new data directly to the first and second secondary storage devices, not writing the new data to the first and second outboard file caches, and not performing said staging steps.

7. In a data processing system having:
a. a first host processor for issuing file access commands, wherein each file access command defines an operation to be performed on a selectable one of one or more files or a selected portion of the one file, the host processor including an input-output logic section which provides an interface for input of data to the host processor and output of data from the host processor;
b. a first outboard file cache coupled to the input-output logic section of the host processor and responsive to the file access commands, wherein the first outboard file cache provides cache storage for the one or more files and includes a cache memory, wherein the cache memory provides random access storage for selectable portions of the one or more files;
c. a second outboard file cache coupled to the input-output logic section of the first host processor and responsive to the file access commands, wherein the second outboard file cache provides cache storage for the one or more files and includes a cache memory, wherein the cache memory provides random access storage for selectable portions of the one or more files;
d. a first, secondary storage device responsively coupled to the input-output logic section of the first host processor for storing the one or more files;
e. a second, secondary storage device responsively coupled to the input-output logic section of the first host processor for storing the one or more files; and
f. a second host processor for issuing file access commands, wherein each file access command defines an operation to be performed on a selectable one of one or more files or a selected portion of the one file, the host processor including an input-output logic section which provides an interface for input of data to the host processor and output of data from the host processor, wherein the second host processor is data connectable to the second secondary storage device, wherein the second host processor is data connectable with the second outboard file cache, a method for reading file data corresponding to file data on the first secondary storage device into the first host processor comprising the steps:
   i. if the cached data is not present in the first outboard file cache, staging the file data from either of the secondary storage devices to the first outboard file cache; and
   ii. reading the data from the first outboard file cache.

8. A method for reading data as recited in claim 7, further comprising:
allocating space on the second outboard file cache sufficient to contain the data in the first outboard file cache.

9. A method for reading data as recited in claim 8, further comprising:
a. checking for an indication that the first host processor is transitioning from a single outboard file cache mode to a dual outboard file cache mode before said allocating step; and
b. if said indicator indicates said transition, not performing said allocating step.

10. In a data processing system having:
a. a first host processor for issuing file access commands, wherein each file access command defines an operation to be performed on a selectable one of one or more files or a selected portion of the one file, the host processor including an input-output logic section which provides an interface for input of data to the host processor and output of data from the host processor;
b. a first outboard file cache coupled to the input-output logic section of the host processor and responsive to the file access commands, wherein the first outboard file cache provides cache storage for the one or more files and includes a cache memory, wherein the cache memory provides random access storage for selectable portions of the one or more files;
c. a second outboard file cache coupled to the input-output logic section of the host processor and responsive to the file access commands, wherein the second outboard file cache provides cache storage for the one or more files and includes a cache memory, wherein the cache memory provides random access storage for selectable portions of the one or more files;
d. a first, secondary storage device responsively coupled to the input-output logic section of the first host processor for storing the one or more files;
e. a second, secondary storage device responsively coupled to the input-output logic section of the first host processor for storing the one or more files; and
f. a second host processor for issuing file access commands, wherein each file access command defines an operation to be performed on a selectable one of one or more files or a selected portion of the one file, the host processor including an input-output logic section which provides an interface for input of data to the host processor and output of data from the host processor, wherein the second host processor is data connectable to the second secondary storage device, wherein the second host processor is, data connectable with the second outboard file cache, a method for destaging cached data on the first and second outboard file caches corresponding to file data on the first secondary storage device comprising the steps:
   i. writing the cached data from the first outboard file cache to the first secondary storage device;
   ii. writing the cached data from the first outboard file cache to the second secondary storage device; and
   iii. not writing to the secondary storage the cached data from the second outboard file cache corresponding to the file data on the first and second secondary storage devices.

11. A method of destaging as recited in claim 10, further comprising:
a. purging the cached data from the first outboard file cache device after both of said writing steps; and
b. purging the cached data from the second outboard file cache without writing the cached data to either of the first or second secondary storage devices.

12. In a data processing system having:
a. a first host processor for issuing file access commands, wherein each file access command defines an operation to be performed on a selectable one of one or more files or a selected portion of the one file, the host processor including an input-output logic section which provides an interface for input of data to the host processor and output of data from the host processor;
b. a first outboard file cache coupled to the input-output logic section of the host processor and responsive to the file access commands, wherein the first outboard file cache provides cache storage for the one or more files and includes a cache memory, wherein the cache memory provides random access storage for selectable portions of the one or more files;

c. a second outboard file cache coupled to the input-output logic section of the host processor and responsive to the file access commands, wherein the second outboard file cache provides cache storage for the one or more files and includes a cache memory, wherein the cache memory provides random access storage for selectable portions of the one or more files;

d. a first, secondary storage device responsively coupled to the input-output logic section of the first host processor for storing the one or more files;

e. a second, secondary storage device responsively coupled to the input-output logic section of the first host processor for storing the one or more files; and f. a second host processor for issuing file access commands, wherein each file access command defines an operation to be performed on a selectable one of one or more files or a selected portion of the one file, the host processor including an input-output logic section which provides an interface for input of data to the host processor and output of data from the host processor, wherein the second host processor is data connectable to the second secondary storage device, wherein the second host processor is data connectable with the second outboard file cache, a method for initiating a host mode utilizing the first and second outboard file caches comprising:

i. setting an indicator that the host mode is changing from single to dual mode;

ii. preventing writes to either of the first or second outboard file caches while said indicator is set;

iii. destaging all data in the first outboard file cache to the first and second secondary storage devices, if the data is newer than the data in the first and second secondary storage devices;

iv. purging all file data in the second outboard file cache; and v. clearing said indicator.

13. A method as recited in claim 12, further comprising preventing allocation of memory in the second outboard file cache in response to reading of data in the first outboard file cache.

14. In a data processing system having:

a. a first host processor for issuing file access commands, wherein each file access command defines an operation to be performed on a selectable one of one or more files or a selected portion of the one file, the host processor including an input-output logic section which provides an interface for input of data to the host processor and output of data from the host processor;

b. a first outboard file cache coupled to the input-output logic section of the host processor and responsive to the file access commands, wherein the first outboard file cache provides cache storage for the one or more files and includes a cache memory, wherein the cache memory provides random access storage for selectable portions of the one or more files;

c. a second outboard file cache coupled to the input-output logic section of the host processor and responsive to the file access commands, wherein the second outboard file cache provides cache storage for the one or more files and includes a cache memory, wherein the cache memory provides random access storage for selectable portions of the one or more files;

d. a first, secondary storage device responsively coupled to the input-output logic section of the first host processor for storing the one or more files;

e. a second, secondary storage device responsively coupled to the input-output logic section of the first host processor for storing the one or more files; and f. a second host processor for issuing file access commands, wherein each file access command defines an operation to be performed on a selectable one of one or more files or a selected portion of the one file, the host processor including an input-output logic section which provides an interface for input of data to the host processor and output of data from the host processor, wherein the second host processor is data connectable to the second secondary storage device, wherein the second host processor is data connectable with the second outboard file cache, a method for operating the data processing system to recover from failure of either of the first or second outboard file cache comprising:

i. initializing the first and second outboard file caches to contain the same cached data;

ii. initializing the first and second secondary storage devices to contain the same file data;

iii. reading the file data from the first secondary storage device, including staging the file data from the first secondary storage device to the first outboard file cache if the data is not present in the first outboard file cache;

iv. updating the cached data in the first and second outboard file caches corresponding to the file data in the first and second secondary storage devices, including staging the file data from the first or second secondary storage device to the first outboard file cache if the data is not present in the first outboard file cache, including staging the file data from the first or second secondary storage device to the second outboard file cache if the data is not present in the second outboard file cache;

v. destaging the cached data in the first and second outboard file caches, including writing the cached data from the first outboard file cache to the first and second secondary storage devices, including not writing the cached data from the second outboard file cache to either first or second secondary storage devices; and vi. recovering from a failure of one outboard file cache, including informing the operating system that the failed outboard file cache is not to have data read from or written to, and resuming data processing.

15. A method for operating a data processing system as recited in claim 14, wherein the first host processor, first outboard file cache, and first secondary storage device reside at a first site and the second host processor, second outboard file cache, and second secondary storage device reside at a second site, further comprising:

recovering from failure of the first site, including ensuring the second host processor is in communication with the second outboard file cache, ensuring the second host processor is in communication with the second secondary storage device, and resuming data processing at the second site.

16. A data processing system comprising having a first and a second host processor for issuing file access commands, wherein each file access command defines an operation to be performed on a selectable one of one or more files or a selected portion of the one file, each host processor including an input-output logic section which provides an interface for input of data to the host processor and output of data from the host processor; a first outboard file cache coupled to the input-output logic section of the first host processor; a second outboard file cache coupled to the input-output logic section of the second host processor and responsive to the file access commands, wherein each outboard file cache provides cache storage for the one or more files and includes a cache memory, wherein the cache memory provides random access storage for selectable portions of the one or more files; a first secondary storage device responsively coupled to the input-output logic section of the first host processor for storing the one or more files; and a second secondary storage device responsively coupled to the input-output logic section of the second host processor for storing the one or more files, wherein the improvement comprises:

a. the second outboard file cache being coupled to the input-output logic section of the first host processor and responsive to the file access commands, wherein the second outboard file cache provides cache storage for the one or more files and includes a cache memory, wherein the cache memory provides random access storage for selectable portions of the one or more files;

b. means for initializing the first and second outboard file caches to contain the same cached data;

c. means for initializing the first and second secondary storage devices to contain the same file data;

d. means for reading the file data from the first secondary storage device, including staging the file data from the first secondary storage device to the first outboard file cache if the data is not present in the first outboard file cache;

e. means for the first host updating the cached data in the first and second outboard file caches corresponding to the file data in the first and second secondary storage devices, including the first host writing data to both the first and second outboard file caches;

f. means for destaging the cached data in the first and second outboard file caches, including the first host writing the cached data from the first outboard file cache to the first secondary storage device, including the second host writing the cached data from the second outboard file cache to the second secondary storage device; and g. means for recovering from a failure of the first host processor, first outboard file cache, or first secondary storage device including resuming data processing utilizing the second host processor, second outboard file cache, and second secondary storage device.

17. A data processing system comprising:

a. a first host processor for issuing file access commands, wherein each file access command defines an operation to be performed on a selectable one of one or more files or a selected portion of said one file, said first host processor including an input-output logic section which provides an interface for input of data to said host processor and output of data from said first host processor;

b. a second host processor for issuing file access commands, wherein each file access command defines an operation to be performed on a selectable one of one or more files or a selected portion of said one file, said second host processor including an input-output logic section which provides an interface for input of data to said second host processor and output of data from said second host processor;

c. a first outboard file cache coupled to said input-output logic section of said first host processor and responsive to said file access commands, wherein said first outboard file cache provides cache storage for said one or more files and includes a cache memory, wherein said cache memory provides random access storage for selectable portions of said one or more files;

d. a second outboard file cache coupled to said input-output logic section of said first and second host processors and responsive to said file access commands, wherein said second outboard file cache provides cache storage for said one or more files and includes a cache memory, wherein said cache memory provides random access storage for selectable portions of said one or more files;

e. a first secondary storage device responsively coupled to said input-output logic section of said first host processor for storing said one or more files; and f. a second secondary storage device responsively coupled to said input-output logic section of said second host processor for storing said one or more files.

18. A data processing system comprising:

a. a first host processor for issuing file access commands, wherein each file access command defines an operation to be performed on a selectable one of one or more files or a selected portion of said one file, said first host processor including an input-output logic section which provides an interface for input of data to said first host processor and output of data from said first host processor;

b. a first outboard file cache coupled to said input-output logic section of said first host processor and responsive to said file access commands, wherein said first outboard file cache provides cache storage for said one or more files and includes a cache memory, wherein said cache memory provides random access storage for selectable portions of said one or more files;

c. a second outboard file cache coupled to said input-output logic section of said first host processor and responsive to said file access commands, wherein said second outboard file cache provides cache storage for said one or more files and includes a cache memory, wherein said cache memory provides random access storage for selectable portions of said one or more files;

d. a first, secondary storage device responsively coupled to said input-output logic section of said first host processor for storing said one or more files;

e. a second host processor for issuing file access commands, wherein each file access command defines an operation to be performed on a selectable one of one or more files or a selected portion of said one file, said second host processor including an input-output logic section which provides an interface for input of data to said second host processor and output of data from said second host processor, wherein said second host processor is responsively coupled to said second outboard file cache;

f. a second, secondary storage device responsively coupled to said input-output logic section of said second host processor for storing said one or more files;

g. means for initializing said first outboard file cache and first secondary storage device to contain the same data, in combination, as said second outboard file cache and said second secondary storage device;

h. means for reading said file data from said first secondary storace device, including staging said file data from said first secondary storage device to said first outboard file cache if said data is not present in said first outboard file cache;

i. means for updating said cached data in said first and second outboard file caches corresponding to said file data in said first and second secondary storage devices, including said first host writing data to said first and second outboard file caches;

j. means for destaging said cached data in said first and second outboard file caches, including said first host writing said cached data from said first outboard file cache to said first secondary storage device, including said second host writing said cached data from said second outboard file cache to said second secondary storage device; and k. means for recovering from a failure of said first host, first secondary device, or first outboard file cache, including resuming data processing utilizing said second host, second secondary storage device, and second outboard file cache.

19. In a data processing system having:

a. a first host processor for issuing file access commands, wherein each file access command defines an operation to be performed on a selectable one of one or more files or a selected portion of the one file, the host processor including an input-output logic section which provides an interface for input of data to the host processor and output of data from the host processor;

b. a first outboard file cache coupled to the input-output logic section of the first host processor and responsive to the file access commands, wherein the first outboard file cache provides cache storage for the one or more files and includes a cache memory, wherein the cache memory provides random access storage for selectable portions of the one or more files;

c. a second outboard file cache coupled to the input-output logic section of the first host processor and responsive to the file access commands, wherein the second outboard file cache provides cache storage for the one or more files and includes a cache memory, wherein the cache memory provides random access storage for selectable portions of the one or more files;

d. a first, secondary storage device responsively coupled to the input-output logic section of the first host processor for storing the one or more files;

e. a second, secondary storage device;

f. a second host processor for issuing file access commands, wherein each file access command defines an operation to be performed on a selectable one of one or more files or a selected portion of the one file, the second host processor including an input-output logic section which provides an interface for input of data to the second host processor and output of data from the host processor, wherein the second host processor input-output logic section is responsively coupled to the second secondary storage device for storing the one or more files, wherein the second host processor is responsively coupled to the second outboard file cache, wherein the second outboard file cache provides cache storage for the one or more files and includes a cache memory, wherein the cache memory provides random access storage for selectable portions of the one or more files; a method for updating cached data corresponding to file data in the first and second secondary storage devices with new data comprising the steps:

i. writing the new data to the first outboard file cache; and ii. writing the new data to the second outboard file cache.

20. A method for updating cached data as recited in claim 19, further comprising:

a. checking for an indication that the first host processor is transitioning from a single outboard file cache mode to a dual outboard file cache mode before said staging and writing steps; and b. if said indicator indicates said transition, writing the new data directly to the first secondary storage device, not writing the new data to the first outboard file cache.

21. In a data processing system having:

a. a first host processor for issuing file access commands, wherein each file access command defines an operation to be performed on a selectable one of one or more files or a selected portion of the one file, the host processor including an input-output logic section which provides an interface for input of data to the host processor and output of data from the host processor;

b. a first outboard file cache coupled to the input-output logic section of the first host processor and responsive to the file access commands, wherein the first outboard file cache provides cache storage for the one or more files and includes a cache memory, wherein the cache memory provides random access storage for selectable portions of the one or more files;

c. a second outboard file cache coupled to the input-output logic section of the first host processor and responsive to the file access commands, wherein the second outboard file cache provides cache storage for the one or more files and includes a cache memory, wherein the cache memory provides random access storage for selectable portions of the one or more files;

d. a first, secondary storage device responsively coupled to the input-output logic section of the first host processor for storing the one or more files;

e. a second host processor for issuing file access commands, wherein each file access command defines an operation to be performed on a selectable one of one or more files or a selected portion of the one file, the host processor including an input-output logic section which provides an interface for input of data to the host processor and output of data from the host processor, wherein the second host processor is responsively coupled to the second outboard file cache; and f. a second, secondary storage device responsively coupled to the input-output logic section of the second host processor for storing the one or more files; a method for initiating a host mode utilizing the first and second outboard file caches comprising:

i. setting an indicator that the host mode is changing from single to dual mode;

ii. preventing writes to the first outboard file cache while said indicator is set;

iii. destaging all data in the first outboard file cache to the first secondary storage devices, if the data is newer than the data in the first secondary storage device;

iv. copying data from the first secondary storage device to the second outboard file cache; and v. clearing said indicator.

22. In a data processing system having:

a. a first host processor for issuing file access commands, wherein each file access command defines an operation to be performed on a selectable one of one or more files or a selected portion of the one file, the first host processor including an input-output logic section which provides an interface for input of data to the host processor and output of data from the host processor;

b. a first outboard file cache coupled to the input-output logic section of the first host processor and responsive to the file access commands, wherein the first outboard file cache provides cache storage for the one or more files and includes a cache memory, wherein the cache memory provides random access storage for selectable portions of the one or more files;

c. a second outboard file cache coupled to the input-output logic section of the first host processor and responsive to the file access commands, wherein the second outboard file cache provides cache storage for the one or more files and includes a cache memory, wherein the cache memory provides random access storage for selectable portions of the one or more files;

d. a first, secondary storage device responsively coupled to the input-output logic section of the first host processor for storing the one or more files;

e. a second host processor for issuing file access commands, wherein each file access command defines an operation to be performed on a selectable one of one or more files or a selected portion of the one file, the host processor including an input-output logic section which provides an interface for input of data to the host processor and output of data from the host processor, wherein the second host processor is coupled to the second outboard file cache; and f. a second, secondary storage device responsively coupled to the input-output logic section of the second host processor for storing the one or more files, a method for operating the data processing system to recover from failure of the first host processor, first outboard file cache, or first secondary storage device comprising:

i. initializing the second outboard file cache and second secondary storage device to contain the same data, in combination, as the first outboard file cache and the first secondary storage device;

ii. reading the file data from the first secondary storage device, including staging the file data from the first secondary storage device to the first outboard file cache if the data is not present in the first outboard file cache;

iii. updating the cached data in the first and second outboard file caches corresponding to the file data in the first and second secondary storage devices;

iv. destaging the cached data in the first and second outboard file caches, including the first host writing cached data from the first outboard file cache to the first secondary storage device, including the second host writing cached data from the second outboard file cache to the second secondary storage device; and v. recovering from a failure of the first host processor, first secondary storage device, or first outboard file cache, including resuming data processing utilizing the second host processor, second outboard file cache, and second secondary storage device.

23. A method for operating a data processing system as recited in claim 22, wherein the first host processor, first outboard file cache, and first secondary storage device reside at a first site and the second host processor, second outboard file cache, and second secondary storage device reside at a second site.

24. An apparatus for recovering from an error in a data processing system having a host processor which is coupled to a first outboard file cache, a first secondary storage device and a second secondary storage device, the host processor reading and writing data to the first outboard file cache and the first secondary storage device and writing the same data to both the first secondary storage device and the second secondary storage device, the data processing system further including a second outboard file cache, comprising:

a. initializing means coupled to the host processor for initializing write communication with the second outboard file cache so that when the host processor writes data to the first outboard file cache, the same data is written to the second outboard file cache; and b. cache recovery means coupled to the host processor for recovering from one or more errors detected in the first outboard file cache by terminating communication with the first outboard file cache and initializing read communication with the second outboard file cache so that the host processor both reads and writes data to the second outboard file cache.

25. An apparatus for recovering from an error in a data processing system having a first host processor which is coupled to a first outboard file cache, a second outboard file cache, a first secondary storage device and a second secondary storage device, the first host processor having a single outboard cache mode wherein the host processor reads and writes data to either the first outboard file cache or the second outboard file cache but not both, the first host processor having a dual outboard cache mode wherein the first host processor writes data to both the first outboard file cache and the second outboard file cache and reads data from either the first outboard file cache or the second outboard file cache but not both, comprising:

a. initializing means coupled to the first host processor to initialize the first host processor into the dual outboard cache mode so that the first host processor writes data to both the first outboard file cache and the second outboard file cache and reads data from the first outboard file cache, and writes the same data to both the first secondary storage device and the second secondary storage device; and b. host recovery means coupled to the first host processor to recover from a failure in the first host processor, said recovery means terminating the dual outboard cache mode and initiating the single outboard cache mode with the second host processor so that the second host processor reads and writes data to the second outboard file cache and the second secondary storage device.

26. A method for recovering from an error in a data processing system having a host processor which is coupled to and in communication with a first outboard file cache, a first secondary storage device and a second secondary storage device, the host processor reading and writing data to the first outboard file cache and the first secondary storage device and writing the same data to both the first secondary storage device and the second secondary storage device, the data processing system further including a second outboard file cache, the method comprising the steps of:

a. initializing write communication with the second outboard file cache so that when the host processor writes data to the first outboard file cache, the same data is written to the second outboard file cache;

b. if one or more errors occur in the first outboard file cache, recovering from said one or more errors by terminating communication with the first outboard file cache and initializing read communication with the second outboard file cache so that the host processor both reads and writes data to the second outboard file cache; and c. if one or more errors occur in the second outboard file cache, recovering from said one or more errors by terminating communication with the second outboard file so that the host processor only reads and writes data to the first outboard file cache.

27. A method according to claim 26 wherein the step of initializing write communication with the second outboard file cache comprises the steps of:
 a. setting an indicator to indicate that write communication is being initialized;
 b. preventing writes to either the first outboard file cache or the second outboard file cache while said indicator is set;
 c. destaging all the data in the first outboard file cache to the first secondary storage device, if the data is newer than the data in the first secondary storage device;
 d. purging all the data in the second outboard file cache;
 e. copying the data from the first secondary storage device to the second outboard file cache; and
 f. clearing said indicator.

28. A method according to claim 27 wherein step (e) further includes the step of copying the data from the first secondary storage device to the second secondary storage device.

29. A method for recovering from an error in a data processing system having a host processor which is coupled to and in communication with a first outboard file cache, a second outboard file cache, a first secondary storage device and a second secondary storage device, the host processor having a single outboard cache mode wherein the host processor reads and writes data to either the first outboard file cache or the second outboard file cache but not both, the host processor having a dual outboard cache mode wherein the host processor writes data to both the first outboard file cache and the second outboard file cache and reads data from either the first outboard file cache or the second outboard file cache but not both, the host processor writing the same data to both the first secondary storage device and the second secondary storage device, the method comprising the steps of:
 a. initializing the dual outboard cache mode so that the host processor writes data to both the first outboard file cache and the second outboard file cache and reads data from the first outboard file cache; and
 b. if a failure occurs in the first outboard file cache or the second outboard file cache, recovering from said failure by terminating the dual outboard cache mode and initiating the single outboard cache mode so that the host processor only reads and writes data to the first outboard file cache if no errors were detected in the first outboard file cache, or to the second outboard file cache if no errors were detected in the second outboard file cache.

30. A method according to claim 29 wherein the step of initializing the dual outboard cache mode further comprises the step of initializing the first outboard file cache and the second outboard file cache to contain the same data.

31. A method according to claim 30 wherein the step of initializing the first outboard file cache and the second outboard file cache to contain the same data comprises the steps of:
 a. setting an indicator that the host processor is changing from the single outboard cache mode to the dual outboard cache mode;
 b. preventing writes to either the first outboard file cache or the second outboard file cache while said indicator is set;
 c. destaging all the data in the first outboard file cache to the first secondary storage device, if the data is newer than the data in the first secondary storage device;
 d. purging all the data in the second outboard file cache;
 e. copying the data from the first secondary storage device to the second outboard file cache; and
 f. clearing said indicator.

32. A method according to claim 31 wherein step (e) further includes the step of copying the data from the first secondary storage device to the second secondary storage device.

33. A method according to claim 29 further comprising the step of reinitializing the dual outboard cache mode if the failure which occurred within the first outboard file cache or the second outboard file cache is cured.

34. A method for recovering from an error in a data processing system having a first host processor which is coupled to and in communication with a first outboard file cache, a second outboard file cache, a first secondary storage device and a second secondary storage device, the first host processor having a single outboard cache mode wherein the host processor reads and writes data to either the first outboard file cache or the second outboard file cache but not both, the first host processor having a dual outboard cache mode wherein the first host processor writes data to both the first outboard file cache and the second outboard file cache and reads data from either the first outboard file cache or the second outboard file cache but not both, the method comprising the steps of:
 a. initializing the dual outboard cache mode so that the first host processor writes data to both the first outboard file cache and the second outboard file cache and reads data from the first outboard file cache, and writes the same data to both the first secondary storage device and the second secondary storage device; and
 b. if a failure occurs in the first host processor, recovering from said failure by terminating the dual outboard cache mode and initiating the single outboard cache mode with the second host processor so that the second host processor reads and writes data to the second outboard file cache and the second secondary storage device.

35. A method according to claim 34 wherein the step of initializing the dual outboard cache mode further comprises the step of initializing the first outboard file cache and the second outboard file cache to contain the same data.

36. A method according to claim 35 wherein the step of initializing the first outboard file cache and the second outboard file cache to contain the same data comprises the steps of:
 a. setting an indicator that the first host processor is changing from the single outboard cache mode to the dual outboard cache mode;
 b. preventing writes to either the first outboard file cache or the second outboard file cache while said indicator is set;
 c. destaging all the data in the first outboard file cache to the first secondary storage device, if the data is newer than the data in the first secondary storage device;
 d. purging all the data in the second outboard file cache;
 e. copying the data from the first secondary storage device to the second outboard file cache; and
 f. clearing said indicator.

37. A method according to claim 36 wherein step (e)further includes the step of copying the data from the first secondary storage device to the second secondary storage device.

* * * * *